United States Patent
Hisano

(10) Patent No.: US 10,121,382 B2
(45) Date of Patent: Nov. 6, 2018

(54) DATA FLOW CONTROL ORDER GENERATING APPARATUS AND SENSOR MANAGING APPARATUS

(71) Applicant: OMRON Corporation, Kyoto-shi, Kyoto (JP)

(72) Inventor: Atsushi Hisano, Kyoto (JP)

(73) Assignee: OMRON Corporation, Kyoto (JP)

( * ) Notice: Subject to any disclaimer, the term of this patent is extended or adjusted under 35 U.S.C. 154(b) by 397 days.

(21) Appl. No.: 15/079,398

(22) Filed: Mar. 24, 2016

(65) Prior Publication Data

US 2016/0210862 A1   Jul. 21, 2016

Related U.S. Application Data

(63) Continuation of application No. 14/373,845, filed as application No. PCT/JP2013/055414 on Feb. 28, 2013.

(30) Foreign Application Priority Data

Sep. 12, 2012 (JP) ................................. 2012-200511
Dec. 14, 2012 (JP) ................................. 2012-273870

(51) Int. Cl.
  *G08G 1/00*  (2006.01)
  *G08G 1/01*  (2006.01)
  (Continued)

(52) U.S. Cl.
  CPC ............. *G08G 1/22* (2013.01); *G08G 1/0112* (2013.01); *G08G 1/0145* (2013.01); *G08G 1/087* (2013.01);
  (Continued)

(58) Field of Classification Search
  None
  See application file for complete search history.

(56) References Cited

U.S. PATENT DOCUMENTS 6,643,571 B2   11/2003  Gotvall et al.
7,406,401 B2   7/2008   Ota et al.
(Continued)

FOREIGN PATENT DOCUMENTS

JP    2000-331284 A   11/2000
JP    3501013 B2      2/2004
(Continued)

OTHER PUBLICATIONS

Extended European Search Report in counterpart European Application No. 16 16 1918.4 dated Aug. 12, 2016 (12 pages).
(Continued)

*Primary Examiner* — Shelley Chen
(74) *Attorney, Agent, or Firm* — Osha Liang LLP

(57) ABSTRACT

There is used a data flow control order generating apparatus that includes: a sensor side metadata acquisition unit acquiring sensor side metadata as information related to a sensor that outputs sensing data; an application side metadata acquisition unit acquiring application side metadata as information related to an application that provides a service by using the sensing data; a matching unit performing matching between the sensor side metadata and the application side metadata to extract the sensor capable of providing the sensing data that satisfies the request of the application; and an instruction unit transmitting a data flow control order that identifies the sensor extracted by the matching unit and the application to a sensor managing apparatus that manages the sensor.

6 Claims, 16 Drawing Sheets

(51) Int. Cl.
    *H04L 12/801*     (2013.01)
    *H04L 29/08*     (2006.01)
    *G08G 1/087*     (2006.01)
    *H04W 4/70*     (2018.01)

(52) U.S. Cl.
    CPC .............. *H04L 47/10* (2013.01); *H04L 67/12* (2013.01); *H04W 4/70* (2018.02)

(56) References Cited

U.S. PATENT DOCUMENTS

| | | | |
|---|---|---|---|
| 7,675,410 B2 | 3/2010 | Aritsuka et al. | |
| 8,099,105 B2 | 1/2012 | Morin | |
| 8,862,715 B1 | 10/2014 | Tom et al. | |
| 9,163,962 B2 | 10/2015 | Ainsworth et al. | |
| 9,256,222 B2 | 2/2016 | Blount et al. | |
| 9,998,451 B2* | 6/2018 | Menzel | H04L 63/083 |
| 2001/0020429 A1* | 9/2001 | Serrano | B61B 13/00 |
| | | | 104/91 |
| 2003/0182183 A1 | 9/2003 | Pribe | |
| 2006/0225329 A1* | 10/2006 | Morrow | G09F 7/04 |
| | | | 40/591 |
| 2007/0288480 A1 | 12/2007 | Caplan et al. | |
| 2008/0106406 A1 | 5/2008 | Yoo et al. | |
| 2008/0164997 A1 | 7/2008 | Aritsuka et al. | |
| 2008/0243440 A1 | 10/2008 | Matsumoto et al. | |
| 2008/0278316 A1 | 11/2008 | Kates | |
| 2009/0019056 A1 | 1/2009 | Othman et al. | |
| 2009/0118889 A1* | 5/2009 | Heino | B62D 1/28 |
| | | | 701/24 |
| 2009/0157461 A1* | 6/2009 | Wright | G06Q 10/06 |
| | | | 705/7.23 |
| 2009/0160679 A1* | 6/2009 | Shackleton | G08G 1/161 |
| | | | 340/988 |
| 2009/0264150 A1 | 10/2009 | Andreasson et al. | |
| 2009/0313241 A1 | 12/2009 | Elsen | |
| 2010/0007483 A1 | 1/2010 | Oh et al. | |
| 2010/0045422 A1 | 2/2010 | Teng et al. | |
| 2011/0055087 A1 | 3/2011 | Chen-Ritzo et al. | |
| 2011/0302351 A1 | 12/2011 | Aybay et al. | |
| 2012/0068858 A1* | 3/2012 | Fredkin | G08G 1/096741 |
| | | | 340/902 |
| 2012/0089708 A1 | 4/2012 | Kim et al. | |
| 2012/0215652 A1 | 8/2012 | Melvin et al. | |
| 2012/0252415 A1* | 10/2012 | Menzel | H04L 63/083 |
| | | | 455/411 |
| 2012/0306634 A1* | 12/2012 | Tsuda | B60Q 1/2611 |
| | | | 340/425.5 |
| 2013/0019020 A1 | 1/2013 | Kang et al. | |
| 2013/0066965 A1 | 3/2013 | Foti | |
| 2013/0073663 A1 | 3/2013 | Eldering | |
| 2013/0097276 A1 | 4/2013 | Sridhar | |
| 2013/0117769 A1 | 5/2013 | Sharma et al. | |
| 2014/0023087 A1 | 1/2014 | Czompo | |
| 2014/0025338 A1 | 1/2014 | Blount et al. | |
| 2014/0140254 A1 | 5/2014 | Nieminen et al. | |
| 2014/0180501 A1* | 6/2014 | Kyllmann | B61L 15/0027 |
| | | | 701/2 |
| 2014/0207869 A1 | 7/2014 | Savolainen | |
| 2015/0006548 A1 | 1/2015 | Huang et al. | |
| 2016/0267796 A1* | 9/2016 | Hiroma | G08G 1/22 |
| 2017/0126793 A1 | 5/2017 | Zavesky et al. | |
| 2017/0236423 A1 | 8/2017 | Bowers et al. | |
| 2017/0261997 A1* | 9/2017 | Switkes | G05D 1/0295 |

FOREIGN PATENT DOCUMENTS

| | | | |
|---|---|---|---|
| JP | 2007-300571 A | 11/2007 | |
| RU | 2251746 C2 | 5/2005 | |
| RU | 2432710 C2 | 10/2011 | |

OTHER PUBLICATIONS

Office Action issued in related U.S. Appl. No. 14/373,845, dated Jun. 30, 2017 (35 pages).

United States Office Action in related U.S. Appl. No. 14/373,845 dated May 25, 2016 (33 pages).

Decision on Grant of a Patent for Invention issued in corresponding Russian Application No. 2014130049/08(048341), dated Jul. 15, 2015 (16 pages).

Decision to Grant a Patent issued in corresponding Japanese Application No. 2013-544617, dated Nov. 26, 2013 (8 pages).

Extended European Search Report issued in corresponding European Application No. 13837851.8, dated Jun. 19, 2015 (8 pages).

International Search Report issued in corresponding Application No. PCT/JP2013/055414, dated Jun. 11, 2013 (2 pages).

Written Opinion issued in corresponding Application No. PCT/JP2013/055414, dated Jun. 11, 2013 (3 pages).

Office Action issued in corresponding U.S. Appl. No. 14/373,845, dated Nov. 16, 2017 (32 pages).

Notice of Allowance issued in U.S. Appl. No. 14/373,845, dated Jun. 27, 2018 (6 pages).

\* cited by examiner

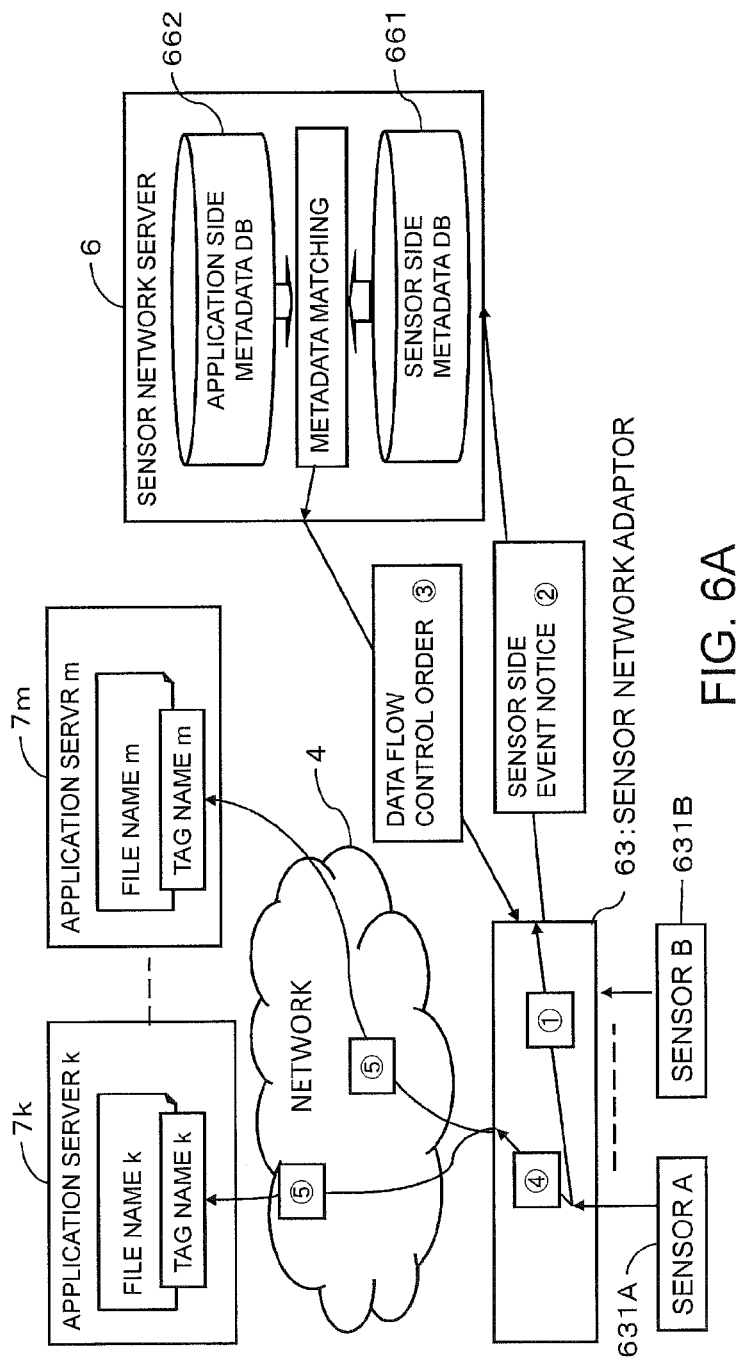

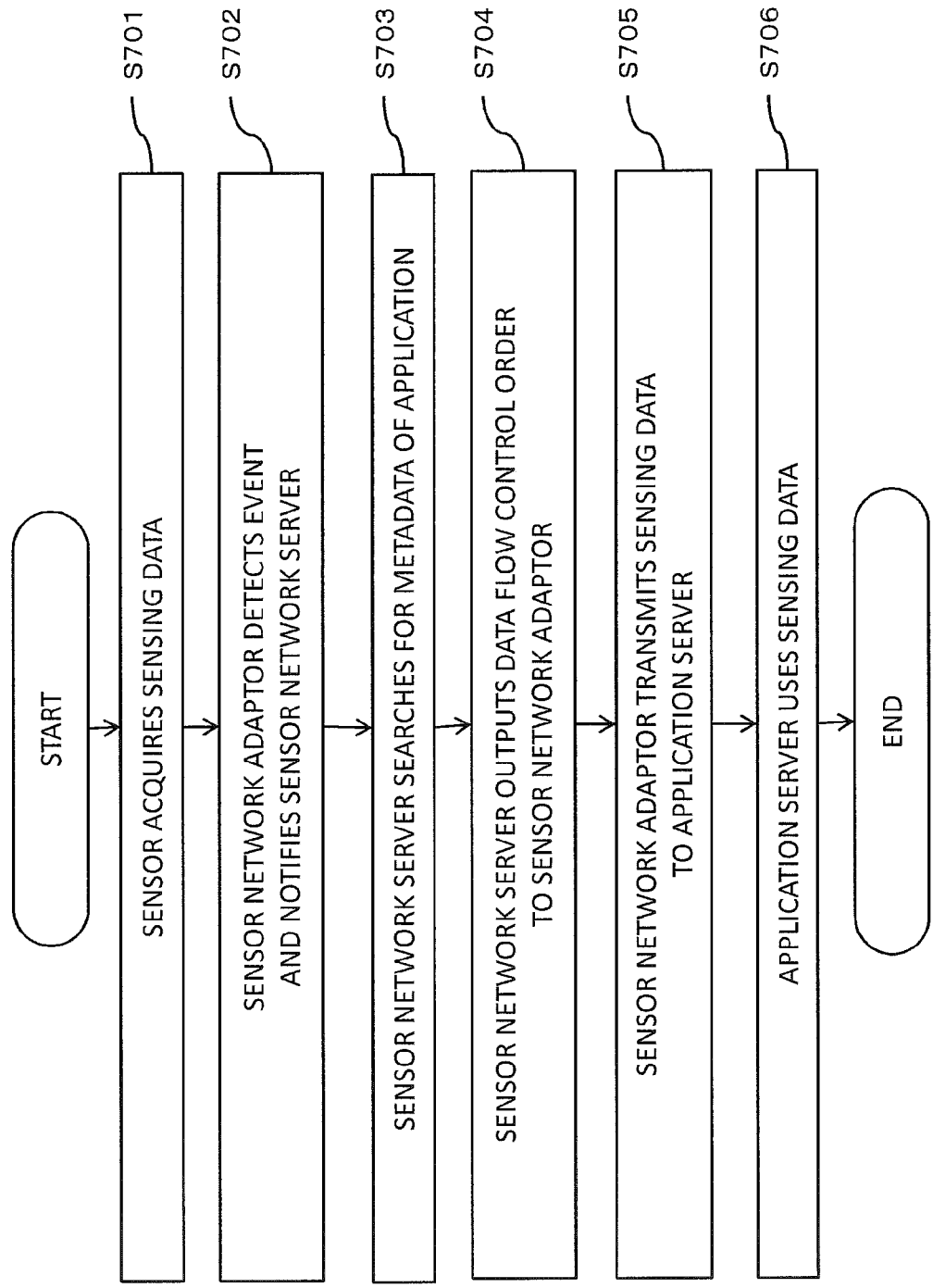

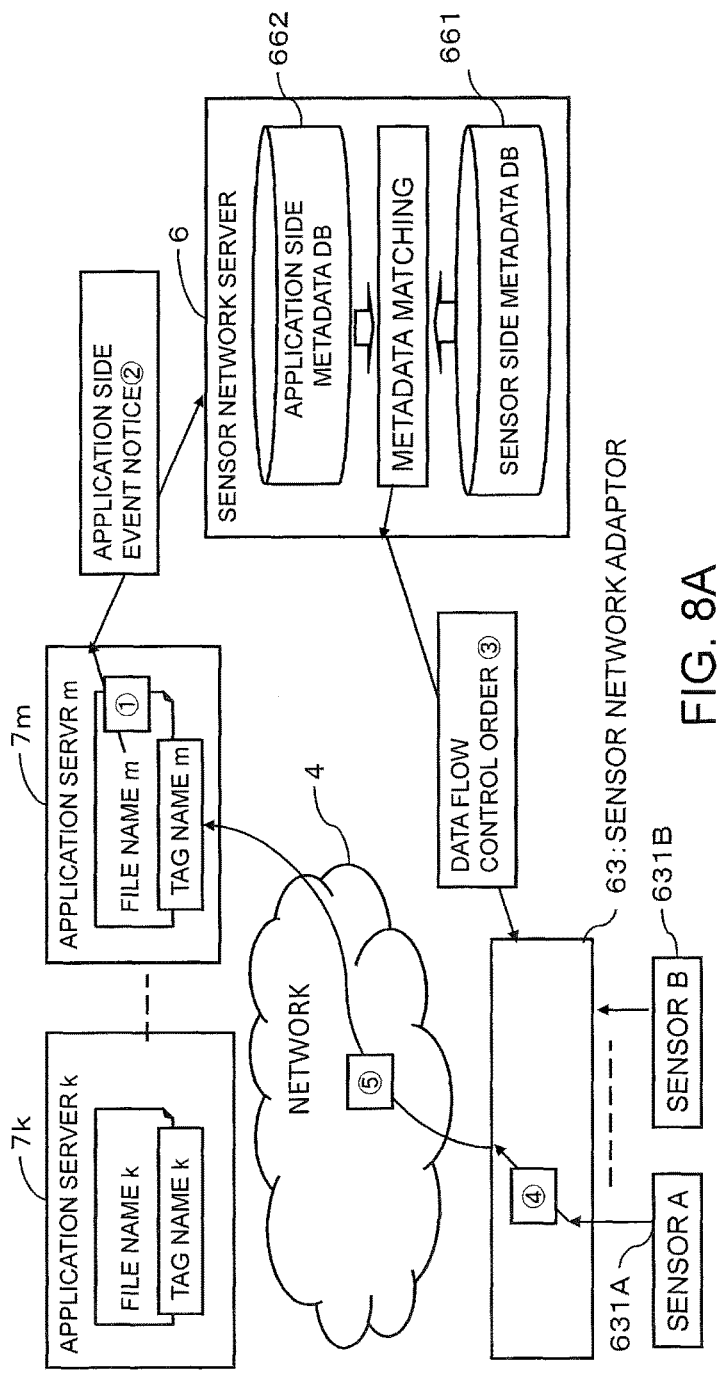

[DATA STRUCTURE]
SENSOR SIDE METADATA ②:
(METADATA, OCCURRENCE EVENT CODE)

DATA FLOW CONTROL ORDER ③:
(SENSOR ADDRESS AS DATA TRANSMISSION SOURCE, DATA TRANSMISSION DESTINATION IP ADDRESS k + FILE NAME k + TAG NAME k, DATA TRANSMISSION DESTINATION IP ADDRESS m + FILE NAME m + TAG NAME m)

[DATA STRUCTURE]
APPLICATION SIDE METADATA ②:
(METADATA, EVENT CODE)

DATA FLOW CONTROL ORDER ③:
(SENSOR ADDRESS AS DATA TRANSMISSION SOURCE, DATA TRANSMISSION DESTINATION IP ADDRESS m + FILE NAME m + TAG NAME m)

[DATA STRUCTURE]
APPLICATION SIDE METADATA ②:
(METADATA, EVENT CODE)

DATA FLOW CONTROL ORDER ③:
(IP ADDRESS OF M2M CLOUD, RECORD NUMBER OF SENSING DATA AS DATA TRANSMISSION TARGET, DATA TRANSMISSION DESTINATION IP ADDRESS m + FILE NAME m + TAG NAME m)

FIG. 12A

METADATA OF SENSOR AND SENSING DATA

1. ATTRIBUTE INFORMATION OF SENSOR
   (1) SENSOR TYPE
   (2) POSITION AND ATTITUDE OF SENSOR
   (3) OWNER ID OF SENSOR
   (4) ID AND ADDRESS OF SENSOR
   (5) OPERATION HISTORY INFORMATION OF SENSOR
2. ATTRIBUTE INFORMATION OF SENSING TARGET
   (1) TARGET TYPE
   (2) PHYSICAL ATTRIBUTE OF TARGET
   (3) ID OF TARGET
3. ATTRIBUTE INFORMATION OF SENSING TARGET AREA
   (1) POSITIONAL RANGE
   (2) TEMPORAL RANGE
4. ATTRIBUTE INFORMATION OF SENSING OPERATION
   (1) SENSING CONTROL PARAMETER
   (2) SAMPLING SPECIFICATION, QUANTIZATION SPECIFICATION
5. MANGEMENT ATTRIBUTE OF SENSING DATA
   (1) ID OF MANAGER OR OWNER
   (2) ACCESS PERMISSION AREA
   (3) ACCURACY, UNIT SYSTEM
   (4) RELIABILITY
   (5) AVAILABLE AREA
   (6) SYSTEM OF COMPENSATION FOR USE
   (7) ID OF USE SENSOR
   (8) SENSING DATA ID

FIG. 12B

METADATA OF SENSING DATA REQUIRED BY APPLICATION AND APPLICATION ITSELF

1. ATTRIBUTE INFORMATION OF REQUIRED SENSOR
   (1) SENSOR TYPE
   (2) POSITION AND ATTITUDE OF SENSOR
2. ATTRIBUTE INFORMATION OF REQUIRED SENSING TARGET
   (1) TARGET TYPE
   (2) PHYSICAL ATTRIBUTE OF TARGET
   (3) ID OF TARGET
3. ATTRIBUTE INFORMATION OF REQUIRED SENSING TARGET AREA
   (1) POSITIONAL RANGE
   (2) TEMPORAL RANGE
4. ATTRIBUTE INFORMATION OF REQUIRED SENSING OPERATION
   (1) SENSING CONTROL PARAMETER
   (2) SAMPLING SPECIFICATION, QUANTIZATION SPECIFICATION
5. MANGEMENT ATTRIBUTE OF REQUIRED SENSING DATA
   (1) ACCESS PERMISSION AREA
   (2) ACCURACY, UNIT SYSTEM
   (3) RELIABILITY
   (4) AVAILABLE AREA
   (5) SYSTEM OF COMPENSATION FOR USE
6. METADATA OF APPLICATION ITSELF
   (1) FILE NAME OF APPLICATION
   (2) IP ADDRESS OF SERVER IN WHICH APPLICATION FILE OPERATES
   (3) DEFINITION OF SENSOR SIDE EVENT ALLOWING ACTIVATION OF APPLICATION (EXPRESSION DEFINED BY VALUES OF METADATA OF SENSING DATA AND SENSING DATA)

DATA FLOW CONTROL ORDER GENERATING APPARATUS AND SENSOR MANAGING APPARATUS

CROSS-REFERENCE TO RELATED APPLICATIONS

This is a continuation application of U.S. patent application Ser. No. 14/373,845 filed Jul. 22, 2014, which is a national stage Application of PCT/JP2013/055414, and claims priority to JP2012/273870 and JP2012/200511.

TECHNICAL FIELD

The present invention relates to a sensor network that uses sensing data, and particularly relates to a data flow control order generating apparatus, a sensor managing apparatus, a data flow control order generating program, and a control order data stream.

BACKGROUND ART

An IT environment called an M2M cloud has recently gaining attention. The M2M (Machine to Machine) denotes a system in which machines having various uses, sizes, and performances exchange information on a network. Utilization of the information allows the proper control of each machine and the situation analysis of the real world. With an improvement in wireless communication technology that supports the M2M and a reduction in the size and cost of the machine, expectations for the commercialization of the M2M have been raised.

The embodiment of this M2M technology implemented on a cloud computing environment is called the M2M cloud. In the M2M cloud, basic functions required for the M2M, e.g., services such as collection, accumulation, processing, and analysis of data are provided as applications on the cloud, and the applications can be used from anywhere. It is possible to enhance reliability and exhaustivity by centralized management of data. In addition, a user has the advantage of being able to use collected data and computer resources only as needed. Consequently, it is possible to analyze big data to obtain an added value without individually constructing systems so that the application in a wide range of fields is expected.

In addition, as described in Patent Literature 1, a technology called a sensor network is studied. In this technology, sensor devices (hereinafter also referred to as "sensors" simply) each having a sensing function and a communication function are installed at various places and industrial facilities and are networked together to thereby allow the collection, management, and seamless use of sensing data.

Normally, the sensor is installed for collecting data required by its owner. Accordingly, in many cases, the sensor is not used except when the owner performs data collection (the sensor itself is not operated, or the sensing data is not used even when the sensor is operated). Consequently, the degree of circulation of the sensing data is low, and the analysis and use of data have been limited to the owner of the sensor no matter how meaningful the data is to a third party. As a result, this has led to duplication of an investment in facilities and network congestions caused by communication with the sensors installed by the individual owners.

In addition, a technology called IoT (Internet of Things) is studied. This creates new values by combining information items related to many things present in the world on the Internet, and seamless development of various services including an infrastructure is expected. In order to create the values from the IoT, it is necessary to be aware of the state of the thing connected to the Internet, and sensing and communication are important element technologies.

CITATION LIST

Patent Literature

PTL 1: Japanese Patent Application Laid-open No. 2007-300571
PTL 2: Japanese Patent Application Laid-open No. 2000-331284

SUMMARY OF INVENTION

It is necessary to make a large number of sensing data items collected from all over the world available for various corporations and organizations according to their purposes by constructing the above-described sensor network.

The present applicants are further conducting elaborate studies on the development of the sensor network. Examples of the development of the sensor network include creation and provision of added values by processing data on an application server capable of processing big data, and achievement of economic effects by activating the transaction of the sensing data. For example, the owner of the sensor can obtain a compensation by permitting a data user to temporarily use the sensor or providing the sensing data to the date user. In addition, the user has the advantage of being able to obtain required data inexpensively because an investment in the installation of the sensor is not necessary.

The above-described sensor network according to the studies of the applicants can be one form for specifically implementing the M2M cloud in the point that data items acquired by machines (sensor devices mounted on the machines) installed at various locations are intensively managed and made available. If the sensor network based on the M2M cloud is implemented, it becomes possible to grasp data items that vary in data type, acquisition position, and time in an appropriate form from anywhere and make use of the data items. Consequently, the application of the sensor network in a wide range of fields from industrial fields such as a manufacturing scene and physical distribution to living fields such as a security, medical services, and education, and infrastructural fields such as smart grid and a traffic control system is expected.

In addition, in the IoT, there is formed a system for optimizing resources such as time, space, people, things, information, and energy at various granularities. To optimize denotes to transfer the resource from where necessity is low to where necessity is high or to use the resource in a form having a high value, and transactions such as the transfer of the resource, setting of a license, and payment of the compensation are performed. However, conventionally, a mechanism for circulating the sensing data or the like has not been developed.

One or more embodiments of the present invention provide the mechanism for properly circulating the resources such as the sensing data and the like in a system in which many things are connected on the network.

One or more embodiments of the present invention adopt the configuration in which the circulation of the sensing data is optimized by performing a data flow control in the sensor network. One or more embodiments of the present invention include a data flow control order generating apparatus including a sensor side metadata acquisition unit acquiring sensor side metadata as information related to a sensor that outputs sensing data; an application side metadata acquisition unit acquiring application side metadata as information related to an application that provides a service by using the sensing data; a matching unit performing matching between the sensor side metadata and the application side metadata to extract the sensor capable of providing the sensing data that satisfies a request of the application; and an instruction unit transmitting a data flow control order that identifies the sensor extracted by the matching unit and the application to a sensor managing apparatus that manages the sensor.

According to the configuration, the matching is performed between the application side metadata and the sensor side metadata, and the application that requires the sensing data is associated with the sensor capable of providing the data. Subsequently, the data flow control order is transmitted to the apparatus that manages the sensor. With this, the circulation of the sensing data based on various conditions is promoted, the service is improved, and both of the data provider and the data user profit. Herein, the metadata denotes information used for the retrieval and matching by a server, the sensor side metadata denotes information related to the attribute of each of the sensor and the sensing data obtained by the sensor, and the application side metadata denotes information related to the attribute of each of the application and the sensing data required by the application. In addition, the data flow control order includes information that identifies the sensor as the data provider and the application as the data user, and is order information that orders the circulation of the data from the data provider to the data user. In the details of the instruction to the sensor managing apparatus by the data flow control order, it is possible to order the sensor managing apparatus to cause the sensing data of one sensor to be circulated to a plurality of the applications. In addition, it is also possible to order the sensor managing apparatus to cause the sensing data from each of the plurality of the sensors to be circulated to one application. Further, it is also possible to order the sensor managing apparatus to cause the sensing data from each of the plurality of the sensors to be circulated to the plurality of the applications.

In one or more embodiments, the sensor side metadata acquisition unit and the application side metadata acquisition unit can adopt various configurations. For example, there is a method in which the metadata is pre-stored in a DB that is accessible from the data flow control order generating apparatus. In this case, since the metadata required for the matching process is already in the DB, an event notice may appropriately be performed from the sensor side or the application side as a trigger with which the data flow control order is issued. Further, the data flow control order generating apparatus can adopt the configuration in which any of the sensor side metadata DB and the application side metadata DB is not present. In this case, the metadata is transmitted from the sensor managing apparatus that detects the event occurrence or the application.

One or more embodiments of the present invention include a data flow control order generating apparatus including: a sensing data metadata acquisition unit acquiring metadata of sensing data as information related to the sensing data obtained by a sensor and stored in a database on a network; an application side metadata acquisition unit acquiring application side metadata as information related to an application that provides a service by using the sensing data; a matching unit performing matching between the metadata of the sensing data and the application side metadata to extract the sensing data that satisfies a request of the application; and an instruction unit transmitting a data flow control order that identifies the sensing data extracted by the matching unit and the application to the database on the network.

According to the configuration, irrespective of the presence or absence of the actual sensor, when the sensing data is present in the DB, the data matching is performed with the application that requires the data, and the data flow control order is transmitted. With this, the promotion of the data circulation and the profit for each of the data provider and the data user are achieved.

One or more embodiments of the present invention include a sensor managing apparatus that manages a sensor by using sensor side metadata as information related to the sensor that outputs sensing data including an order reception unit receiving a data flow control order that identifies the sensor extracted as the sensor that satisfies a request of an application by matching between application side metadata as information related to the application that provides a service by using the sensing data and the sensor side metadata, and the application, and a transmission unit transmitting the sensing data from the extracted sensor to the application using a predetermined packet system via a network.

According to the configuration, complicatedness when the sensing data is provided on the side of the sensor managing apparatus is reduced, and the circulation of the sensing data is promoted. That is, the sensor managing apparatus may appropriately receive the control order based on the result of the matching and control data transmission according to the control order. As a result, a compensation for use is determined, and an owner of the sensor can obtain a proper profit.

Note that, as the configuration, it is possible to adopt the configuration in which the transmission unit notifies the data flow control order generating apparatus of the event occurrence, or the configuration in which the transmission unit transmits the sensor side metadata in conjunction with the event occurrence.

One or more embodiments of the present invention include a data flow control order generating program causing an information processing apparatus to execute a sensor side metadata acquisition step of acquiring sensor side metadata as information related to a sensor that outputs sensing data, an application side metadata acquisition step of acquiring application side metadata as information related to an application that provides a service by using the sensing data, a matching step of performing matching between the sensor side metadata and the application side metadata to thereby extract the sensor capable of providing the sensing data that satisfies a request of the application, and an instruction step of transmitting a data flow control order that identifies the sensor extracted in the matching step and the application to a sensor managing apparatus that manages the sensor.

One or more embodiments of the present invention include a program operating in an information processing apparatus of a sensor managing apparatus that manages a sensor by using sensor side metadata as information related to the sensor that outputs sensing data, the program causing the information processing apparatus to execute an order reception step of receiving a data flow control order that identifies the sensor extracted as the sensor that satisfies a request of an application by matching between application side metadata as information related to the application that provides a service by using the sensing data and the sensor side metadata, and the application, and a transmission step of transmitting the sensing data from the extracted sensor to the application using a predetermined packet system via a network.

According to one or more embodiments, by controlling the provision of the sensing data to the application by using the data flow control order created based on the comparison result of the metadata, the optimization of the data circulation is achieved, the service is improved, and the data provider and the data user profit.

One or more embodiments of the present invention include a control order data stream that can be read by an information processing apparatus that manages a sensor outputting sensing data, the control order data stream including information identifying an application that requires the sensing data, information identifying a sensor extracted as the sensor that satisfies a request of the application, and order information identifying the extracted sensor and the application.

In addition, the information identifying the application and the information identifying the sensor can be obtained by matching between the sensor side metadata as the information related to the sensor and the application side metadata as the information related to the application.

Thus, the use of the control order data stream created based on the result of the matching of the metadata or the like allows contribution of the information processing apparatus that manages the sensing data to the proper data circulation.

Note that, as described above, one or more embodiments of the present invention can be considered as the data flow control order generating apparatus or the sensor managing apparatus, and can also be viewed as the system in which the above apparatuses are unified or the system that includes the sensor and the application server in addition to the above apparatuses. In addition, one or more embodiments of the present invention can be considered as the method that includes the process in at least any of the individual apparatuses described above, and can also be regarded as the data stream for implementing the method, the program for causing the computer to execute each step of the method, or a recording medium in which the program is recorded.

According to one or more embodiments of the present invention, it is possible to provide the mechanism for properly circulating the resources such as the sensing data and the like in the system in which many things are connected on the network.

BRIEF DESCRIPTION OF DRAWINGS

FIG. 6A is a view for explaining a data flow control in a sensor side event-driven type access mode in accordance with one or more embodiments and FIG. 6B is a view showing a data structure used in the control in accordance with one or more embodiments;

FIG. 7 is a flowchart for explaining the data flow control in the sensor side event-driven type access mode in accordance with one or more embodiments and FIG. 8A is a view for explaining a data flow control in an application side event-driven type access mode in accordance with one or more embodiments and FIG. 8B is a view showing a data structure used in the control in accordance with one or more embodiments;

FIG. 12A is a view showing a data structure of metadata used in the sensor and the sensing data in accordance with one or more embodiments and FIG. 12B is a view showing a data structure of the metadata used in the application in accordance with one or more embodiments.

DESCRIPTION OF EMBODIMENTS

Figure 1:
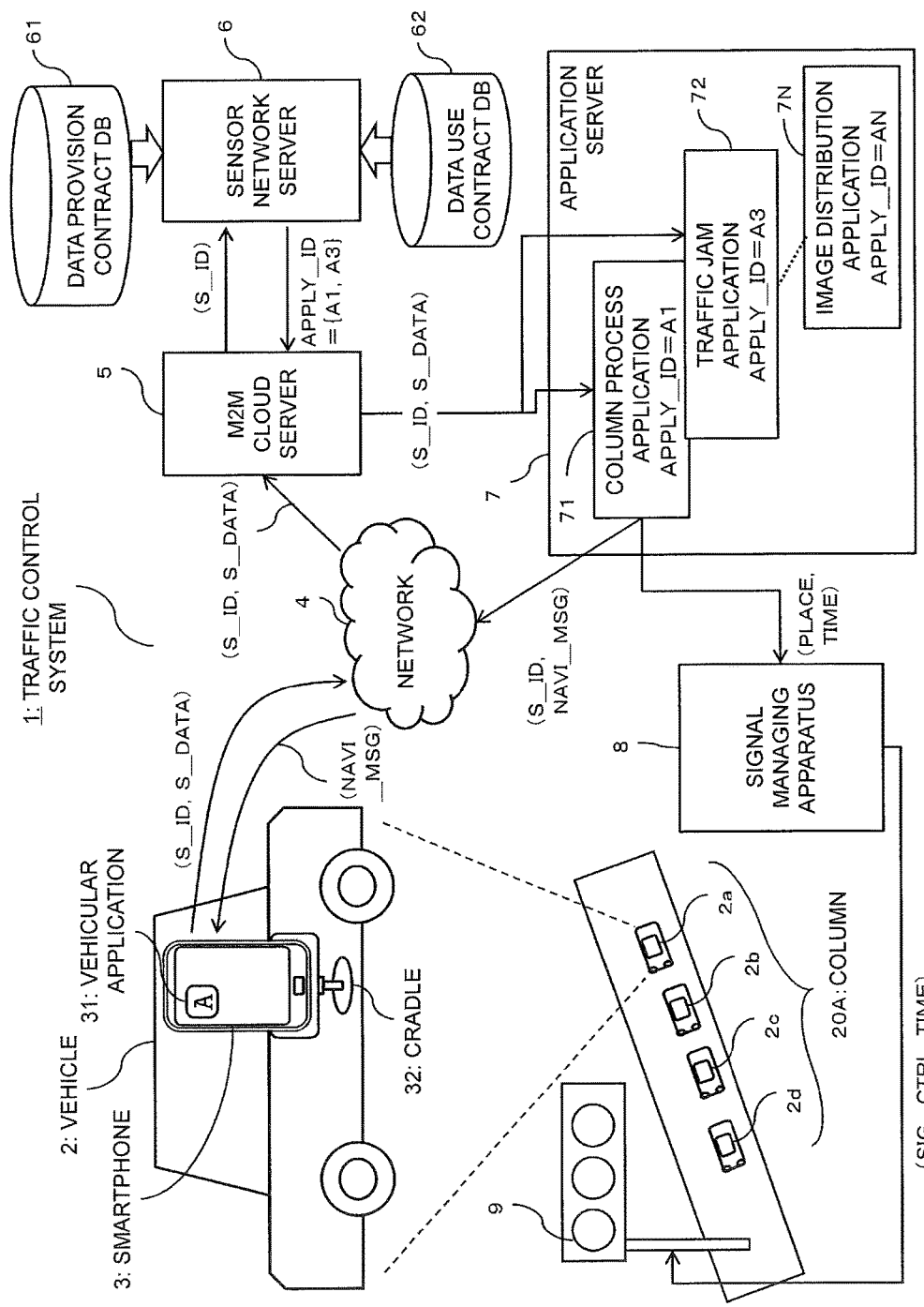
FIG. 1 is a view showing the entire configuration of a traffic control system in accordance with one or more embodiments.

Hereinbelow, one or more embodiments of the present invention are described with reference to the drawings. Note that the description of each configuration should be appropriately changed according to the configuration and various conditions of a system to which the invention is applied, and the scope of the present invention is not intended to be limited to the following description.

As described above, if the sensor network based on the M2M cloud is implemented, it becomes possible to grasp and make use of various data from anywhere in an appropriate form, and hence the application in a wide range of fields is expected.

In particular, in the traffic control system, since there are various relevant sensor devices such as individual vehicles, traffic signals, and cameras installed at various locations, there is a strong request for processing sensing data to implement smooth traffic.

The traffic jam reduces social productivity due to time loss and waste of fuel, and causes traffic accidents and deterioration of the surrounding environment.

On general roads, the main cause of the traffic jam is a reduction in traffic volume due to a traffic signal serving as a bottleneck. Consequently, among control operations performed by the traffic control system, the control of the change timing and times of a red light and a green light is important in achieving smooth traffic. In particular, the importance of the traffic signal at an intersection is high because the traffic signal is involved in a plurality of traffic flows.

On general roads, individual vehicles have different destinations and the driving technique and awareness of compliance with speed limits vary among drivers so that the speed and the moving direction vary among the vehicles. As a result, for example, the vehicle blocks the passage of the following vehicle to slow down the traffic flow by stopping at the intersection to turn left or right, changing lanes, and changing its speed, and the traffic jam is thereby caused.

In our country, the traffic signal is usually controlled under the supervision of the police and, from among control patterns predetermined for each traffic signal, the control pattern corresponding to a day of the week and a time period is selected on a road with a large traffic volume. In order to increase the traffic volume on the road as much as possible, it is necessary to control the change timing and the time of the green light so as to allow as many vehicles as possible (or as many passengers in the vehicles as possible) to pass. At this point, if the control pattern of the signal can be changed flexibly according to the actual traffic conditions, the control is considered to contribute to smooth traffic.

For public vehicles such as buses and emergency vehicles, a system called PTPS (Public Transportation Priority System) is used mainly in combination with bus lanes. This is a technology in which the time of the green light is prolonged when the presence of the bus is detected by the traffic signal, and the use of the public transportation is promoted by securing punctuality of the bus operation to satisfy passengers. As a result, the transportation of a large number of people by the bus and a reduction in the number of vehicles are to be achieved. In addition, a system that prioritizes the emergency vehicles such as fire engines and ambulances is under consideration, but there is no such a system for general vehicles.

On the other hand, the advantage obtained by a plurality of vehicles traveling in column on a road is examined from various viewpoints. First, energy saving by the column traveling is expected. When vehicles form a column, the vehicle on the downstream side of the flow of air such as traveling wind is positioned behind the vehicle on the upstream side thereof, and wind pressure of the downstream vehicle is reduced. As a result, the fuel efficiency of each vehicle can be improved.

Patent Literature 2 describes a technology used when a plurality of members form a group with a plurality of vehicles. In this case, in order to inform a driver in a vehicle of the positions of the other vehicles belonging to the group, each of the vehicle acquires its position using a GPS (Global Positioning system) device provided in the vehicle, and transmits the position to the other vehicles by using a cellular phone and the like. When receiving the information, the positions of the vehicles belonging to the group are displayed on the map of a car navigation device.

In the case of Patent Literature 2, the members of the group are people planning to perform the column traveling such as, e.g., colleagues in a company or friends sharing the same hobby. From the viewpoint of the traffic system side, the traffic jam can be probably suppressed to a level lower than the level in the case where the vehicles travel separately.

Thus, traveling of a plurality of vehicles that have the same destination (inclusive of an intermediate destination on a traveling route) or route and a traveling time period in column is useful for the driver and from the traffic viewpoint.

However, when the vehicles perform the column traveling, a problem arises before the group is made up and the column is formed, and a problem arises during the column traveling. The former is the problem that the column cannot be formed unless the drivers get to know each other and determine the destination or route and the traveling time period in advance. The latter is the problem that, when the number of vehicles is increased, the vehicle that loses sight of the other vehicles occurs. The latter also includes the problem that, depending on the length of the column, the green light is switched to the red light during the passage below the traffic signal and a part of the vehicles cannot travel together with the other vehicles.

The traffic control system is actively involved in the formation of the group to guide the vehicle and remove obstacles during the traveling instead of letting the vehicles voluntarily form the column and travel to the destination.

Further, in addition to the column traveling, the positional relationship between the vehicles traveling on the road is also important. For example, there are cases where it is necessary to have a predetermined distance or more to the other vehicle or, conversely, there are cases where the vehicle wants to travel within a predetermined range of the other vehicle.

In view of such circumstances, the technology of the present embodiment supports the formation of the positional relationship between the vehicles to allow smooth traveling in the traffic control system by using the sensor network.

<Entire Configuration of System>

The entire configuration of the traffic control system according to the present invention is described with reference to a block diagram of FIG. 1. A vehicular positional relationship formation support control in the present embodiment is the formation support for the vehicular column that allows preferential treatment during the passage of the vehicular column below the traffic signal. However, the details of the control are not limited thereto, and the control includes the support control for causing the vehicular positional relationship to satisfy predetermined conditions through the details thereof are described later.

A traffic control system 1 is configured by a vehicle 2, a smartphone 3 as a mobile communication terminal held by a driver or the like to be disposed in the vehicle 2, a network 4 for a mobile terminal with which the smartphone 3 communicates, an M2M cloud server 5 that provides a cloud environment, a sensor network sever 6 that performs services related to a sensor network, an application server 7, a signal management apparatus 8, and a traffic signal 9. The configuration of each block described above can be designed arbitrarily and is not particularly limited. In addition, the configuration of the network 4 or the communication method between the blocks is not particularly limited. Hereinbelow, the configuration and the function of each block of the traffic control system 1 are described in greater detail.

(Vehicle 2)

The vehicle 2 travels from an origin to a destination according to the operation of the driver. The drawing depicts a state where four vehicles 2a to 2d form a group and travel in a column 20A on a road.

(Smartphone 3)

The smartphone 3 is a mobile communication terminal disposed in the vehicle 2 by the driver or a passenger. The smartphone 3 has an information processing apparatus such as CPU or the like mounted thereon, and an application can be installed and used in the smartphone 3. In addition, the smartphone 3 has a GPS function of acquiring a current position. Further, the smartphone 3 is preferably capable of acquiring the movement speed of the vehicle 2 using an acceleration sensor. Furthermore, the smartphone 3 has a unit receiving an input from the driver, and a unit outputting information to the driver. As the former input unit, there is used a touch panel, a physical button, a virtual button, or a voice input function. As the latter output unit, it is possible to cause the touch panel to also function as a display section, or adopt a voice output system. Further, in the present embodiment, unique ID information (S_ID) for identifying the terminal and by extension the vehicle is stored in an internal memory.

The smartphone 3 can communicate with the M2M cloud server 5 via the network 4, and can further access the information of the sensor network server 6 via the M2M cloud server 5. In addition, the smartphone 3 also acts as a client that uses arithmetic resources of the application server 7. Conversely, these servers acquire information from the vehicle 2 via the network 4. A travel plan information transmission unit and an order information reception unit of the present invention correspond to the communication function of the smartphone 3.

(Vehicular Application 31)

A vehicular application 31 is installed in the smartphone 3. The vehicular application 31 corresponds to a column process application 71 on the application server side, and acquires order information via the network 4. The vehicular application 31 preferably functions as a car navigation application or operates in cooperation with the car navigation application. The CPU performs the control according to the instruction of such an application, and the smartphone 3 thereby functions as a travel support terminal apparatus of the present invention.

(Cradle 32)

It is possible to use a cradle 32 in order to fix the smartphone 3 to the vehicle 2. If the vehicular application 31 is set so as to be activated when the smartphone 3 is placed on the cradle 32, the operation thereof can be simplified. Alternatively, the vehicular application 31 may also be activated when the driver touches an icon on the smartphone 3.

Note that, although the present embodiment uses the smartphone 3 in which the vehicular application 31 is installed and which functions also as a sensor device, the group of devices that have these functions and can transmit/receive information to/from the network 4 may be collectively referred to as the travel support terminal apparatus of the present invention. For example, some of car navigation devices have the function of issuing an instruction for a driving operation using voice, the function of acquiring the current position using the GPS or the like, and the function of displaying the traveling route and the time period when the destination is inputted, and hence these devices can be used in the present invention. In addition, it is possible to use the wireless communication facility of the vehicle as the communication function, and also use the facilities of the vehicle as the GPS function, the display device, and the input unit.

(Network 4)

The network 4 serves as the base for the communication of the smartphone 3 and, as the network 4, existing communication networks constructed by communication companies and the like can be used. In addition, the network 4 is not necessarily a single network, and may be considered as a conceptual network in which a plurality of networks having various communication methods and topologies are connected to each other. In short, the network 4 may be any communication network as long as the communication network allows transmission/reception of information between the vehicle side and the server side.

(M2M Cloud Server 5)

The M2M cloud server 5 is responsible for the entire management of the traffic control system of the present invention. In terms of hardware, the M2M cloud server 5 can be configured by a computer including an information processing apparatus (CPU), a memory, an auxiliary storage device (HDD or the like), a communication device, an input device, and a display device. The M2M cloud server 5 has capabilities that allow the M2M to be accessed by sensor devices present at various locations via the network, transmit/receive a large volume of data and accumulate the data, and provide the accumulated data in response to the request from the application.

(Sensor Network Server 6)

The sensor network server 6 is a server apparatus that performs the management of the sensor device related to the sensor network and the like. The sensor network server 6 can also be configured by the computer similar to that of the M2M cloud server.

Herein, the sensor network is briefly described. The sensor network networks the sensor devices each having the sensing function and the communication function to allow the collection and use of sensing data, and the present inventors assume a mechanism in which the owner of the sensor provides the sensing data to data use applicants such as companies or the like and obtains the compensation for the use. With this mechanism, the owner obtains an advantage such as the opportunity for the profit and the user obtains an advantage such as inexpensive data acquisition. The sensor network server 6 is the server apparatus that performs mediation of such transactions, and the sensor device of the present invention is the smartphone 3.

(Data Provision Contract DB 61, Data Use Contract DB 62)

The sensor network server 6 (sensor managing apparatus) stores information related to the owner and the sensor device in a data provision contract DB 61 in response to the registration from the owner. The information related to the sensor device includes the type of the sensor, the position of the sensor, and the application compatible with the sensor. The information related to the owner includes the available period, the purpose of use of data (usable only for academic purposes or the like), and the area of use (usable only in non-profit-making areas), and the compensation. The above information is retained in association with the ID information (S_ID) of each sensor device (the smartphone 3 in this case), and is read in response to the request from the M2M cloud server 5. This corresponds to a device information storage unit.

In addition, the sensor network server 6 stores information related to data use in a data use contract DB 62 in response to the registration from the user. The information includes conditions required by the application, or conditions on the side of the user who needs data directly. For example, the conditions include the type of the data, the place of acquisition, a data acquisition cycle, accuracy, and the upper limit of the compensation to be paid.

The sensor network server 6 refers to these databases to perform matching between the conditions of the user and the sensor, and manages the collection of the charge from the user and the payment of the compensation to the owner according to a use record. In the present embodiment, available application numbers (A1, A2, . . . AN) are stored for each ID information (S_ID). This corresponds to a use condition storage unit.

(Application Server 7)

The application server 7 is a server apparatus that has various applications using the sensing data installed therein, performs arithmetic processing corresponding to the request, and returns the result of the arithmetic processing. The application server 7 can also be configured by the computer.

(Various Applications)

A description is given by using examples of the application. The column process application 71 is an application that performs the main process of the present invention, and extracts a proper vehicle group based on the position and travel plan (the traveling route, the traveling time period of each road section and the like) of each vehicle, and issues an instruction to form the column. In addition, the column process application 71 issues an instruction to the signal managing apparatus 8 such that the column is caused to pass below the traffic signal preferentially.

The other applications are described as examples of the application. A traffic jam map application 72 collects the positional information and the movement speed from the smartphone 3, generates a traffic jam map based on information collected from each vehicle, and sells the traffic jam map to a business operator or the like that uses the road conditions. An image distribution application 7N collects images and moving images taken during traveling from the sensor devices such as the smartphone 3 and a vehicle-mounted camera, and provides them to the user who wants to know the situation at each point. The taken images can be used in an application for detecting damage to the road or an application for detecting an illegally-parked vehicle.

Thus, the user of the sensor network can directly purchase the individual sensing data, and also obtain required information without paying attention to the individual sensing devices by designating the application and requesting the process.

Note that the M2M cloud server 5, the sensor network server 6, and the application server 7 are separated as different blocks in the above description. However, the actual physical arrangement thereof can be freely determined in consideration of the construction cost, required performance, network conditions, or diversification of risk. For example, they may be configured as individual modules of a single apparatus, or may also be used in cooperation with a plurality of computers. In short, when the server capable of transmission/reception of information to/from the sensor devices at various locations and processing a large volume of data using the application is used, the present invention can be implemented. For the purpose of contrasting the travel support terminal apparatus (smartphone) on the vehicle side as the sensor device, the servers described above are collectively referred to as a "server side". Each of the travel plan information reception unit and the order information transmission unit of the present invention uses any of the communication functions on the server side. Further, each of a group extraction unit and an order information generation unit uses any of the information processing apparatuses on the server side. The entire server side can be viewed as a vehicular positional relationship formation support apparatus of the present invention.

(Signal Managing Apparatus 8, Traffic Signal 9)

The signal managing apparatus 8 controls the turning on and off of the red light and the green light of the traffic signal 9 on the road. Normally, from among patterns predetermined for each traffic signal, the pattern corresponding to a day of the week and the time period is selected and the control is performed. However, it is also possible to control the turning on or off state flexibly according to actual traffic conditions and, in the case where the instruction is issued from the column process application 71, the process of causing the column to pass preferentially is executed. In the drawing, the column 20A is about to pass below the traffic signal 9.

<Vehicle Side Process Flow>

Column formation and preferential traveling in the present embodiment are described specifically with reference to FIGS. 2A to 2E.

Figure 2A:
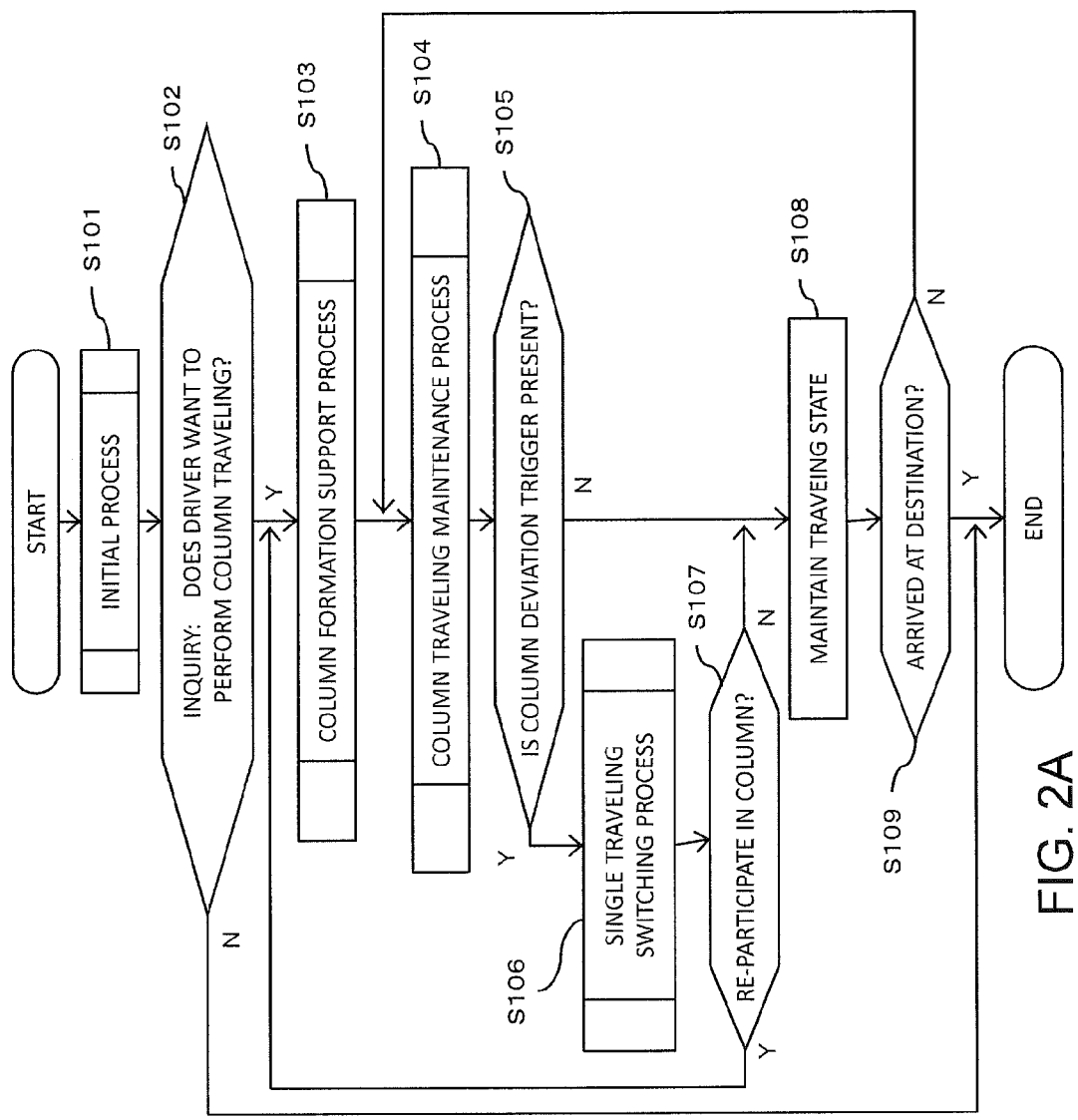
FIG. 2A is a flowchart showing the flow of entire processes related to vehicular column formation in accordance with one or more embodiments.

FIG. 2A is a flowchart showing the summary of the processes in the smartphone 3 related to the vehicular column formation. The flow is started at the point of time when the engine of the vehicle 2 is started and the vehicle 2 starts to travel.

(Initial Process)

In Step S101, an initial process is performed. The detail of the initial process is shown in the flow of FIG. 2B.

Figure 2B:
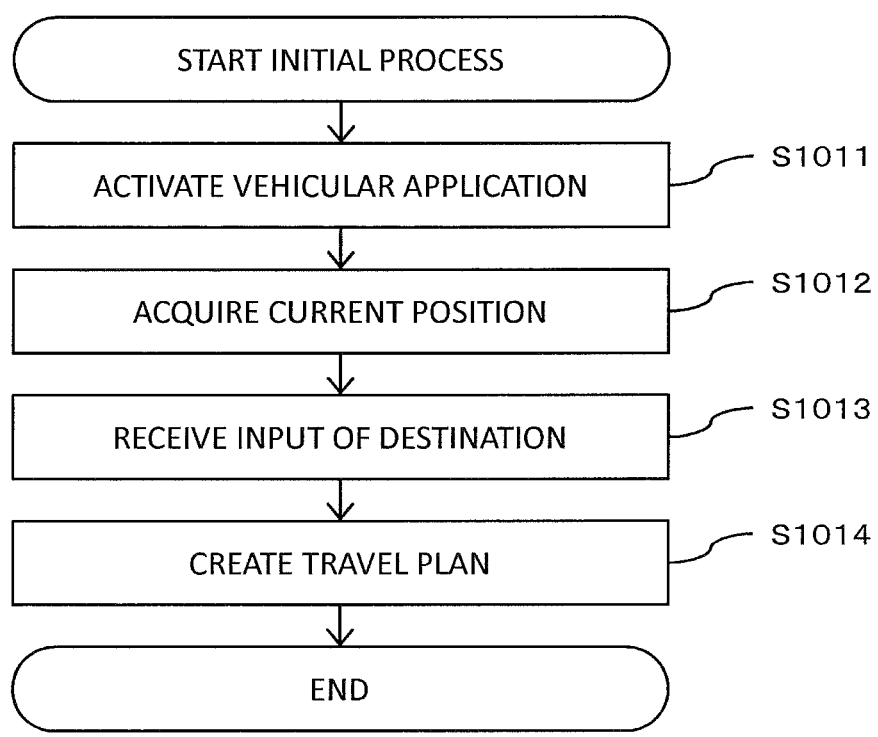
FIG. 2B is a flowchart showing an initial process in the vehicular column formation in accordance with one or more embodiments.

In Step S1011 in FIG. 2B, the vehicular application 31 of the smartphone 3 is activated. The vehicular application 31 may be set so as to be automatically activated when it is connected to the cradle 32 disposed on a dashboard of the vehicle 2, and this setting is preferable in terms of power supply. Alternatively, the driver (the passenger may also activate the vehicular application 31; the same applies to the following description) may activate the vehicular application 31 from the icon. As described above, since the vehicular application functions also as the car navigation application, the driver is willing to activate this application in order to receive its navigation.

In Step S1012, the vehicular application 31 communicates with a GPS satellite by using the GPS function of the smartphone 3 to acquire the current position of the vehicle 2.

In Step S1013, the vehicular application 31 receives the input of the destination that uses the input unit from the driver. The driver inputs the destination, and requests the route guidance by the car navigation.

In Step S1014, the vehicular application 31 creates the travel plan. The travel plan created by the car navigation function includes the traveling route between the current position and the destination and an estimated arrival time. Further, in the present embodiment, the time period of traveling of each of sections obtained by properly dividing the traveling route is determined. This is for allowing the formation of the vehicular column if at least a part of the traveling route of one vehicle matches the traveling route of another vehicle. The division method of the traveling route is arbitrary, and hence the combination of the midpoint and an estimated passage time may be generated, or the entire route may be divided into a plurality of sections by using the intersection or the like as a landmark and the estimated traveling time period of each section may also be calculated.

Information created in each Step (position and destination) is also called the travel plan (S_DATA), and the function of creating the travel plan is also called a travel plan generation unit. In addition, the functions of acquiring information related to the vehicle such as the GPS function and the like are also collectively called a vehicle information acquisition unit.

Returning to the flow in FIG. 2A, in Step 102, the vehicular application 31 confirms whether or not the driver wants to perform the column traveling using the output unit of the smartphone 3. In the case where the driver does not want to perform the column traveling (S102=N), the driver heads for the destination according to the normal car navigation function, and hence the present flow is ended. Note that the present Step may be omitted and the column traveling may be always performed.

(Column Formation Support Process)

In Step S103, a column formation support process is performed. The detail of the present process is shown in the flow in FIG. 2C.

Figure 2C:
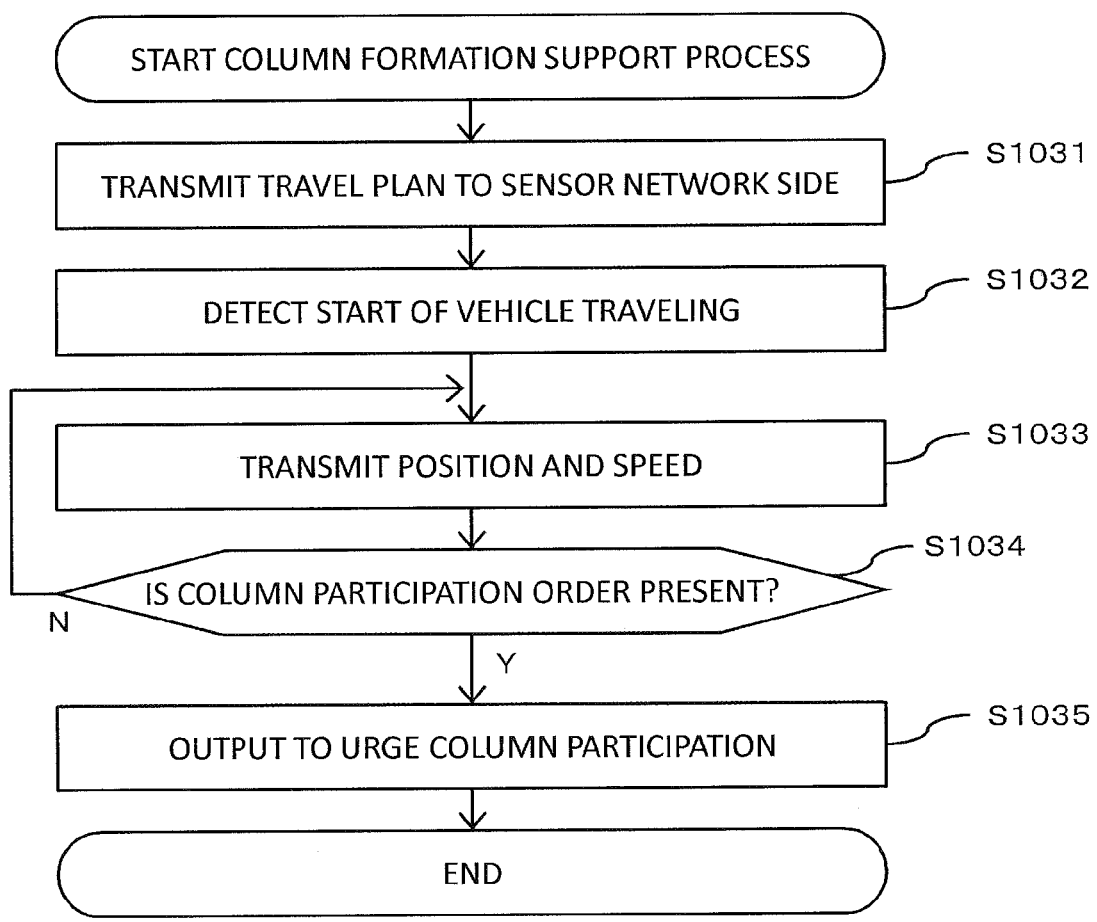
FIG. 2C is a flowchart showing a process when vehicular column formation support is started in accordance with one or more embodiments.

In Step S1031 in FIG. 2C, the vehicular application 31 transmits the travel plan (S_DATA) and the ID information (S_ID) of the smartphone 3 to the M2M cloud server 5. Further, information indicating that "the smartphone 3 is connected to the cradle 32" may also be transmitted. This is for allowing determination of whether or not the smartphone 3 is disposed in the vehicle by the server side. Note that, even in the case where the driver "does not want to perform" the column traveling in Step S102, the travel plan and the ID information may be transmitted. Such a vehicle does not influence the column traveling, but is effective in terms of providing the sensing data to the sensor network.

In Step S1032, the vehicular application 31 detects the start of traveling of the vehicle using the acceleration sensor and the like.

In Step S1033, the vehicular application 31 acquires and transmits the current position and the speed of the vehicle 2. This process is not essential, but is preferably executed in order to accurately perform the order to form the column on the server side.

In Step S1034, the vehicular application 31 inquires whether or not the order to participate in the column comes from the column process application 71 via the network 4. When the order is not present (S1034=N), the process returns to the previous Step, and the inquiry is repeated after a predetermined time.

When the order (NAVI_MSG) is present (S1034=Y), the process advances to Step S1035, and a message for urging the driver to participate in the column is outputted to the driver. Outputting by voice is preferable during traveling. The driver performs the driving operation according to the order of the present Step, and the column is thereby formed. Once the vehicle participates in the column, the vehicle follows the vehicle ahead or the driver continuously drives the vehicle according to the navigation. In the case where the vehicle 2 is the first vehicle of the column, subsequent vehicles participate in the column while the driver drives the vehicle according to the navigation.

(Driving Operation Method at Time of Participation in Column)

In the case where the vehicle 2 participates in the existing column, an order for identifying the vehicle included in the column and forming the column such that other vehicles do not enter into the column is issued. At this point, the method for identifying the vehicle is not particularly limited and a method in which the vehicle is identified using time and voice is outputted such as, e.g., "please follow the vehicle passing on your right side five seconds later" may be used. In addition, it is preferable to inform the driver of outer appearance characteristics such as the type, color, and size of the vehicle. Further, hazard lights of the vehicles that are already in the column are controlled and the information may be transmitted using blinking patterns. Alternatively, a dedicated indicator using an LED and the like is distributed to the vehicle participating in the sensor network and the vehicle may be identified by lighting the indicator.

The completion of the participation in the column is notified from the vehicle side to the server side. Alternatively, the position information items acquired by the individual vehicles using the GPSs are compared on the server side and, when the distance falls within a predetermined distance, the participation may be considered to be completed.

Note that, since the driving technique varies between individuals, in the case where the vehicle fails to participate in the column, it is preferable to take follow-up measures such as recalculation of the traveling route and the notice of timing of re-participation.

In addition, it can be considered that the upper limit of the number of vehicles that can participate in the column is set. This is because, when the column is extremely long, the influence on other vehicles becomes extremely significant.

(Column Traveling Maintenance Process)

Returning to the flow in FIG. 2A, in Step S104, a column traveling maintenance process is performed. The detail of the present process is shown in the flow in FIG. 2D.

Figure 2D:
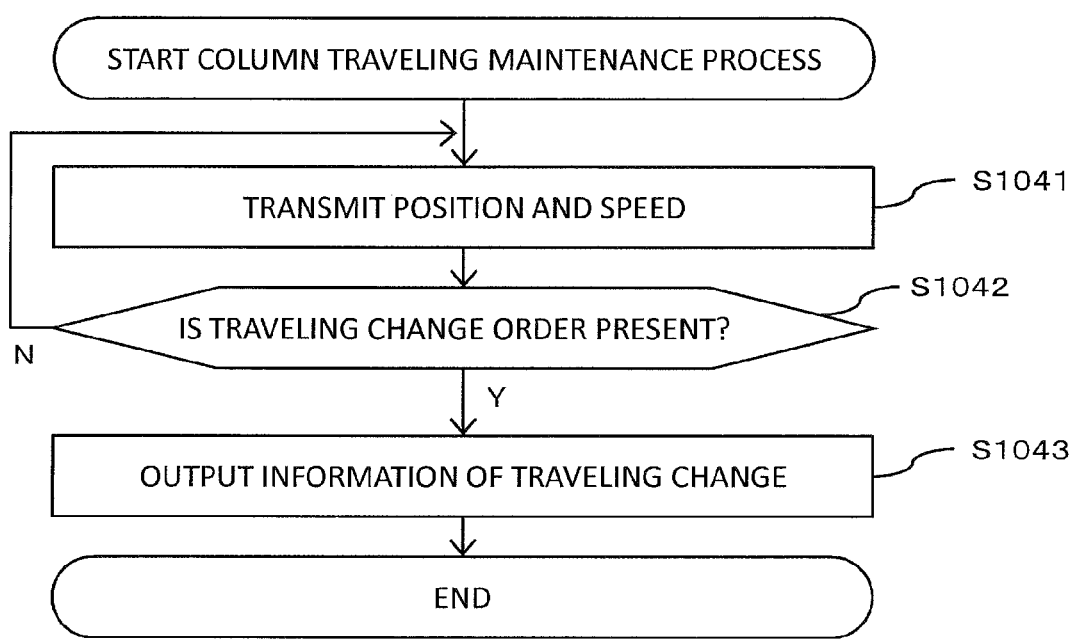
FIG. 2D is a flowchart showing a process while vehicular column traveling is maintained in accordance with one or more embodiments.

In Step S1041 in FIG. 2D, the vehicular application 31 acquires the current position and the speed of the vehicle 2, and transmits them to the server side. The column process application 71 having received this information transmits order information to the vehicle 2 such that the column can perform proper traveling in which the traffic conditions are reflected.

The vehicular application 31 inquires whether or not a change order is present in Step S1042 and, when the change order is present (S1042=Y), the vehicular application 31 receives the change order and advances to Step S1043 to output the change order to the driver. Examples of change information include an instruction for obeying traffic regulations and a driving instruction for accepting the participation of a new vehicle. In addition, an order by the normal car navigation function, e.g., a driving change instruction corresponding to the traffic jam or the traffic regulations is also performed at the same time. As in the present invention, the column can receive the preferential treatment at the traffic signal when the column traveling is maintained.

(Process Related to Column Deviation or Column Continuation)

Returning to the flow in FIG. 2A, in Step S105, the vehicular application 31 detects whether or not a column deviation trigger is present. The column deviation trigger is an event indicative of the column deviation from the inside of the vehicle or the outside thereof. For example, the event from the inside of the vehicle includes explicit or implied deviation request from the driver. The explicit request denotes the case where the intention of the deviation is declared using voice by the driver and the case where a deviation operation is performed using a touch panel by the passenger. The implied request denotes the case where the destination of the car navigation application is changed and the case where the driving operation that deviates the vehicle from the designated route is performed. The event from the outside of the vehicle includes the order information in the case where the vehicle deviates from the common route or the case where the vehicle is determined to be improper as the member of the column for some reason. When the trigger is detected (S105=Y), the process moves to Step S106.

Figure 2E:
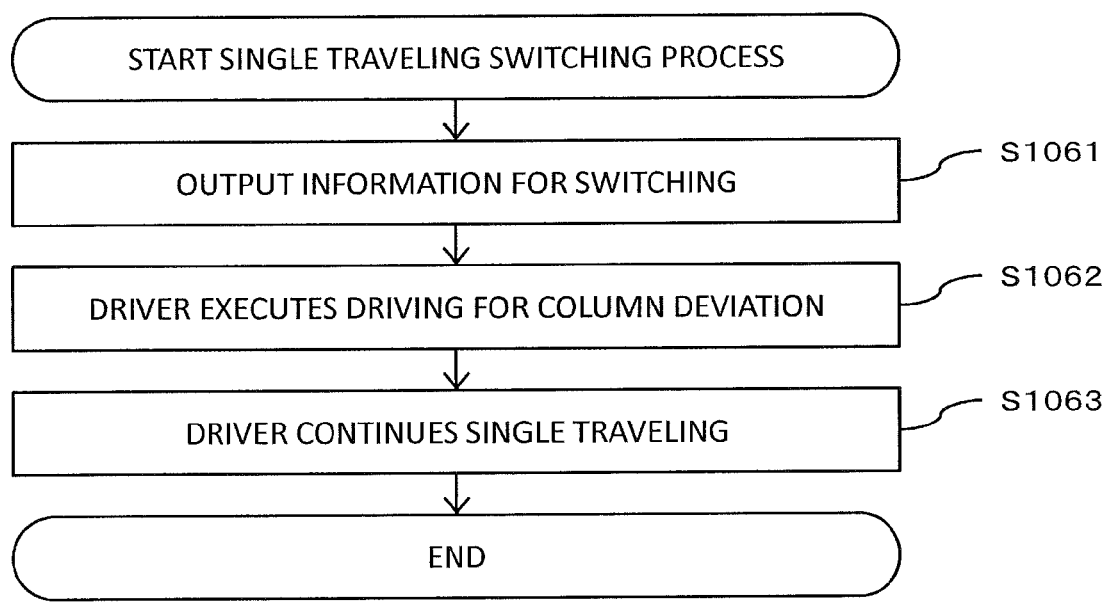
FIG. 2E is a flowchart showing a process when a vehicle switches to single traveling in accordance with one or more embodiments.

The detail of Step S106 is shown in the flow in FIG. 2E.

In Step S1061 in FIG. 2E, the vehicular application 31 outputs information for switching. The instruction method similar to that of the normal navigation may be used.

In Step S1062, the driver executes the driving operation for the column deviation.

In Step S1063, the driver continues single traveling. Note that, even after the driver switches to the single traveling, the vehicle can participate in another column with the wish of the driver or the order from the server side. As the former, there is the case where, after stopping for rest, the vehicle resumes the column traveling. As the latter, there is the case where there are two or more sections where the column can be formed in the entire traveling route.

Returning to FIG. 2A, in Step S107, it is detected whether or not the vehicle re-participates in the column. When the column traveling needs to be resumed due to the circumstances described above (S107=Y), the process returns to S103 and the vehicle participates in another column. On the other hand, in the case where the vehicle does not deviate from the column from the beginning (S105=N) and the case where the single traveling is continued in S107 (S107=N), the process moves to Step S108, and the current traveling state is maintained.

(End Process)

In Step S109, the current position is compared with the inputted destination, and it is thereby determined whether or not the vehicle has arrived at the destination. When the vehicle has arrived at the destination (S109=Y), the information indicative of the arrival is outputted to the driver, and the navigation and the column traveling support are ended. When the vehicle has not arrived at the destination (S109=N), the process returns to Step S104, and the traveling is continued. Note that, in the case where the vehicle already performs the single traveling, S104 and S105 are not applied.

According to the above description, the vehicular application 31 properly guides the driver according to the order from the server side while cooperating with the car navigation application, and thereby induces the driver to participate in and deviate from the column without imposing a burden heavier than normal driving on the driver.

<Processes on Server Side>

Next, the processes on the server side, i.e., in the M2M cloud server 5, the sensor network server 6, and the column process application 71 in the application server 7 are described. In particular, a sensor network process shown in the upper right of FIG. 1 and the process of the column process application 71 shown in FIG. 3 are mainly described.

(Sensor Network Process)

As described above, in association with the ID information (S_ID), the application number (APPLY_ID) that is allowed to use the sensing data from the smartphone having the above ID information is stored in the data provision contract DB 61. With the intervention of the M2M cloud server 5, the sensor network server 6 transmits the information of the sensor device that the column process application 71 (APPLY_ID=A1) can use. In the example of FIG. 1, S_ID corresponding to the vehicle 2 permits (APPLY_ID={A1, A3}) to use the sensing data. That is, in addition to the column process application 71, the data can also be used in the traffic jam map application 73 (APPLY_ID=A3). Note that a billing process to the owner of the column process application 71 is also performed by referring to the data use contract DB 62.

Figure 3:
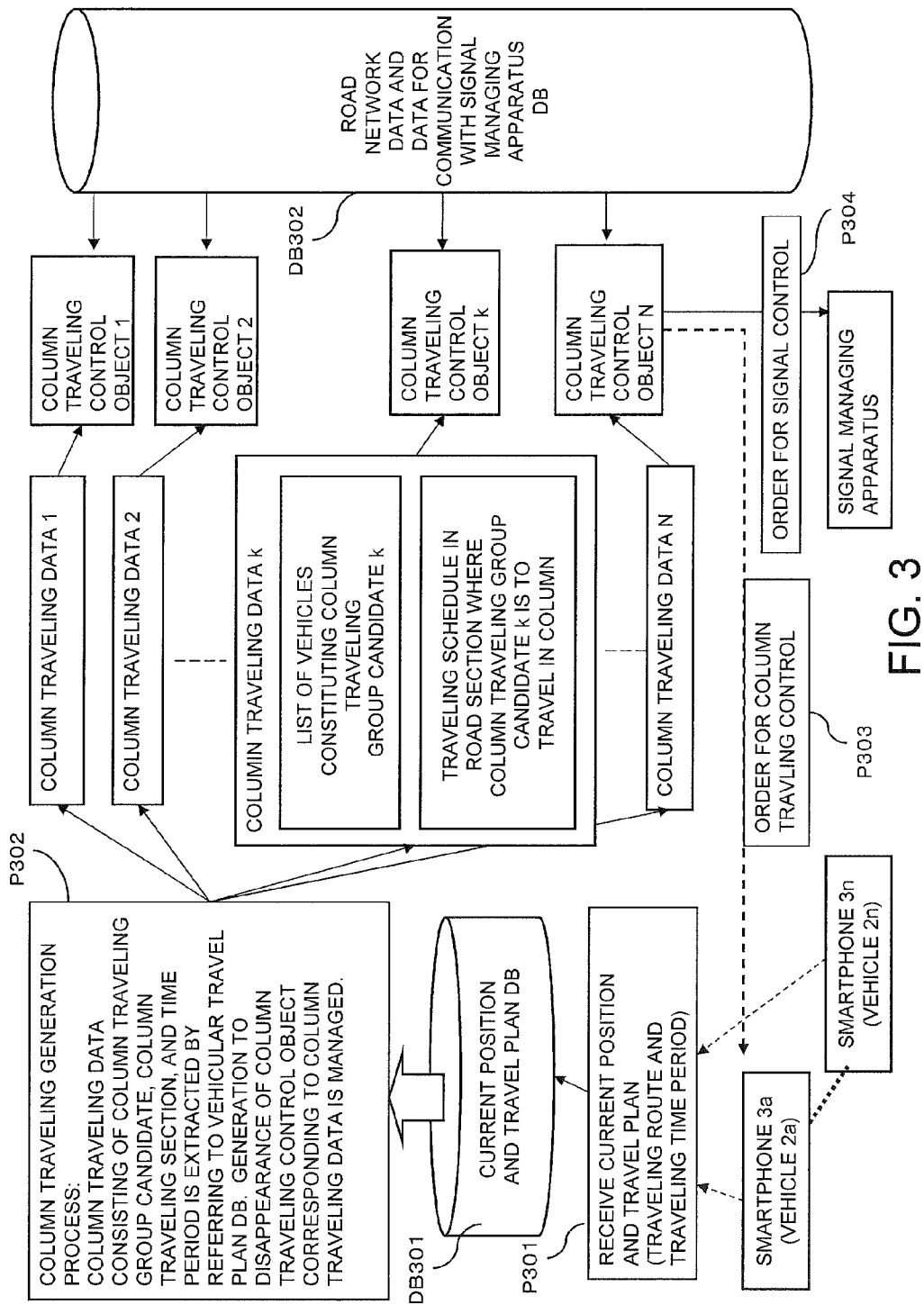
FIG. 3 is a view schematically showing the configuration and process of a column formation support application on a server side in accordance with one or more embodiments.

The M2M cloud server 5 stores the information (S_ID, S_DATA) from the smartphone received via the network 4 in a database (an accumulation unit and corresponds to a current position and travel plan DB 301 in FIG. 3). Among the data items stored in the DB 301, the data item having S_ID obtained from the sensor network server 6 (i.e., the data item of which the use is permitted in the column process application 71) is transmitted to the application server 7 (S_ID, S_DATA). Note that registration or update is performed on the database by the M2M cloud server 5 on an as needed basis based on the result of communication with the smartphone 3 disposed in the vehicle 2 (corresponds to S1041 in FIG. 2D).

(Operation During Column Traveling Control)

In Process P301 in the lower left of FIG. 3, the server side (the M2M cloud server 5 in the present embodiment) acquires the information (S_ID, S_DATA) transmitted from the smartphone 3 and stores the information in the DB 301. With this, a column traveling generation process is started.

In Process P302 in the upper left of FIG. 3, the server side (the column process application 71 in the present embodiment) extracts column traveling data consisting of a column traveling group candidate and the combination of the column traveling section and the column traveling time period. In this process, based on the acquired travel plan for each vehicle, the group of vehicles of which at least a part of the traveling routes overlap one another in the same time period is selected, and the column traveling data consisting of the combination of the column traveling section and the time period is extracted. Further, the generation to disappearance of a column traveling control object is managed for each column traveling data. For example, column traveling data k shown in the center of FIG. 3 includes the list of vehicles constituting a column traveling group candidate k, and the road section and traveling schedule of the column traveling of these vehicles (in other words, information in which the routes of the individual vehicles match each other and the time periods thereof match each other).

That is, in the column traveling generation process, the DB 301 is referred to and, in the case where the number of vehicles that follow the same route in the same time period is a predetermined number or more, the vehicles are extracted as the group. The column traveling data is data defined by the information (S_ID) for identifying the extracted vehicle, information for identifying the section (section information on the map), and the time period, and indicates the candidate of the column of vehicles that travel together for a predetermined time period. When the vehicle group is extracted, the vehicle may be appropriately selected by using the traveling section (also the traveling direction) and the time period as keys. In order to form as many columns as possible, the traveling route may be divided into sections in a range where excessive complicatedness is not caused.

Alternatively, in the grouping of the vehicle, first, the route section of the column traveling may be determined, and the vehicles traveling in the route section in the same time period may also be picked up.

As shown in FIG. 3, in Process P302, each of column traveling control objects (1 to N) is generated for each of column traveling data items (1 to N) by multi-thread processing of the application server 7. Consequently, the number of the column traveling control objects corresponds to the number of columns that can be formed in the traffic control system 1. When the column arrives at the destination and the column traveling is ended, the column traveling control object that has controlled the column disappears.

The main processes of the column traveling control object corresponds to Processes P303 and P304. In P303, an order for the column traveling control (NAVI_MSG in FIG. 1) is transmitted to the vehicles (2a to 2n) that participate in the column. The vehicles having received the order information are driven in the manner indicated by the flows in FIGS. 2C and 2D, and the column traveling is thereby implemented. In P304, an order to request the signal operation is transmitted to the signal managing apparatus 8. This order includes the position information of the target traffic signal and the time when the green light is lit (PLACE, TIME). Then, the signal managing apparatus transmits the lighting instruction and the lighting time of the green light (SIG_CTRL, TIME) to the traffic signal 9. Thus, P303 and P304 are performed in combination and the column is caused to pass preferentially. The column traveling control object refers to a DB 302 in which road network data and data for communication with the signal managing apparatus are stored to obtain information required in P303 and P304.

<State Shift of Column Traveling Control Object>

Figure 4:
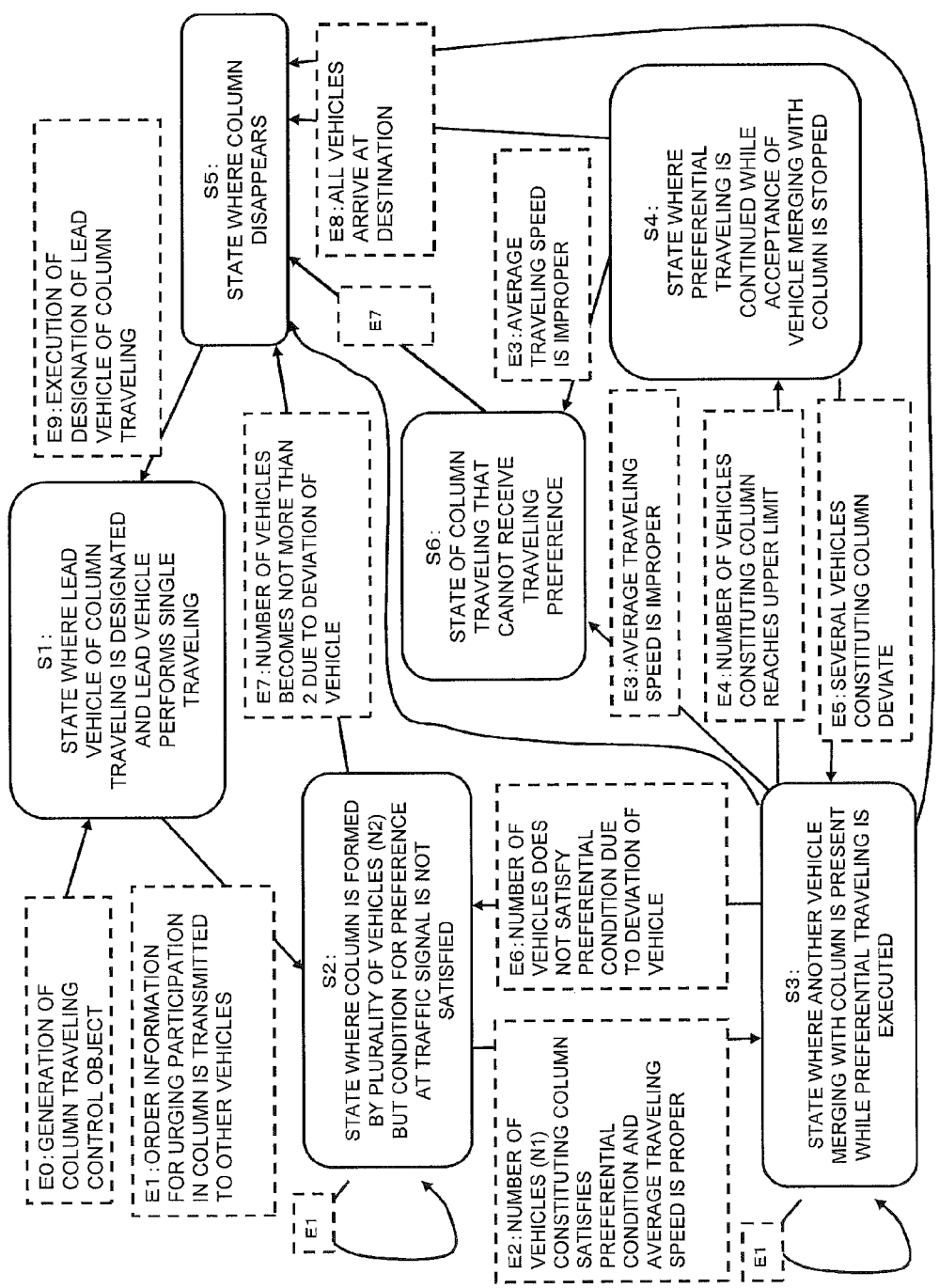
FIG. 4 is a view showing a state shift of a column traveling object of the column formation support application on the server side in accordance with one or more embodiments.

With reference to FIG. 4, the generation to the disappearance of the column traveling control object is examined in detail. In the drawing, E0 to E9 denote events occurring in the column, while S1 to S6 denote the states of the column.

<With Regard to Preferential Process>

Herein, as a premise, the relationship between the number of vehicles and preferential conditions in the present embodiment is described. In the present embodiment, it is assumed that, when the number of vehicles satisfies N1>N2, in the case where N1 or more vehicles participate in the column, the preferential passage at the traffic signal is allowed. In addition, it is assumed that, in the case where N2 or more vehicles participate in in the column, the preferential passage is not allowed but some advantage in the traffic system or some economic advantage is obtained. Examples of such an advantage include the application of a discount on a tall for the use of a highway, discount on fuel at a filling station, and free services at rest facilities such as a PA, a SA, and "Michinoeki". Further, in the present embodiment, the upper limit (N3) is imposed on the number of vehicles that participate in the column, and the influence on vehicles that do not participate in the sensor network is suppressed.

In addition, from the viewpoint of maintaining traffic orders, it is preferable that the right of the preferential passage at the traffic signal is not given to the vehicle that does not satisfy a predetermined safety standard even when the number of vehicles of the column satisfies the preferential conditions. Examples of this case includes the case where the average speed of the column exceeds the legal speed and the case where a vehicle that travels on a road shoulder or is pulled over to the side of the road participates in the column.

(Formation and Maintenance of Column)

E0 denotes that the vehicle group is extracted by the column process application 71 and the column traveling control object is generated. With this, the lead vehicle of the column traveling is designated and the state of the single traveling of the lead vehicle is established (S1). Note that the designated lead vehicle does not need to be conscious of its position.

E1 denotes that the order information for urging participation in the column is transmitted to other vehicles included in the group. With this, the column is formed by a plurality of the vehicles, but the column does not satisfy the conditions for the preference at the traffic signal (S2). At this point, the number of vehicles is not less than N2 and less than N1. A merging order by the event E1 is continuously transmitted to candidate vehicles that do not yet participate in the column. In this state, in order to give the advantage in the traffic system or the economic advantage, the column traveling control object may transmit information of the vehicle participating in the column to an associated business operator.

E2 denotes that the number of vehicles constituting the column becomes not less than N1 that satisfies the preferential condition, and the average traveling speed becomes proper. Herein, the average traveling speed is considered in order to promote safe driving, as described above. With this, the state where the vehicle merging with the column is present while the preferential traveling is executed is established (S3). When the state of S3 is established, the column traveling control object issues an instruction to request the preferential passage of the column to the signal managing apparatus 8 (P304 in FIG. 3).

E3 denotes that the average traveling speed is improper. In this case, the state where the column cannot receive the preference of the traveling is established (S6).

E4 denotes that the number of vehicles constituting the column has reached the upper limit (N3). With this, the state where the preferential traveling is continued while the reception of the vehicle merging with the column is stopped is established (S6). At this point, the column traveling control object does not generate the event E1, and performs only the instruction to the traffic signal and the normal navigation.

E5 denotes that several vehicles constituting the column have deviated. However, when the number of vehicles is not less than N2, the state of S3 where the column can receive the preference is maintained. On the other hand, E6 denotes the case where the number of vehicles does not satisfy the preferential condition (becomes less than N2) due to the deviation of the vehicle, and the state is shifted to S2.

(Disappearance of Column)

E7 denotes that the number of vehicles becomes the number thereof that cannot maintain the column (becomes not more than 2 in the present embodiment) due to the deviation of the vehicle. This event occurs during the column traveling such as S2, S3, or S4. With this, the column is brought into a disappearance state (S5).

E8 denotes that all of the vehicles have arrived at the destination during the column traveling. Also with this, the column is brought into the disappearance state (S5).

After the column disappears with E7 or E8, the column traveling control object disappears. Alternatively, by using the object continuously, the lead vehicle of the next column traveling may also be designated (event E9). In this case, the state is shifted to S1 again.

<Preferential Passage at Traffic Signal>

Figure 5:
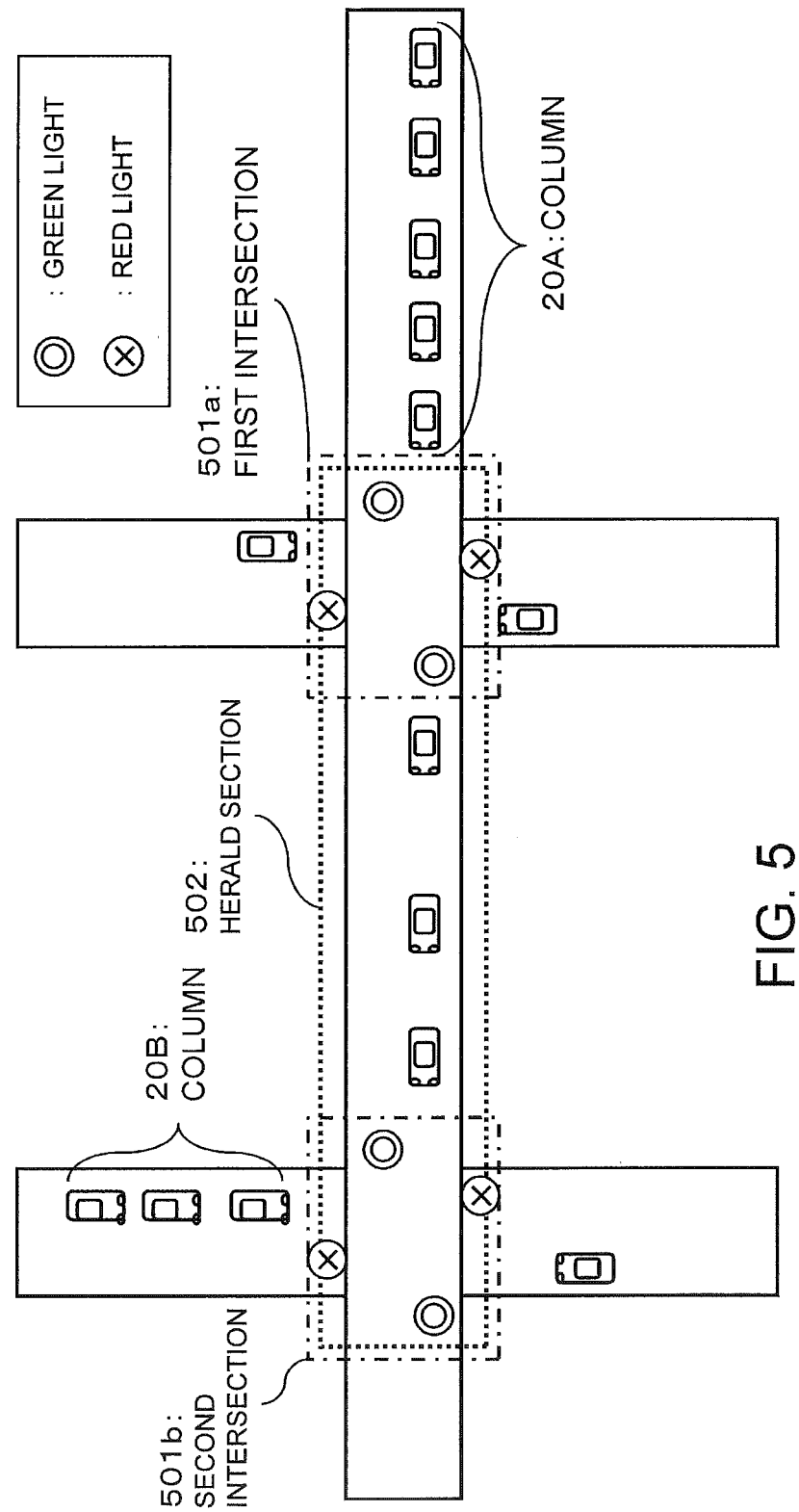
FIG. 5 is a schematic view for explaining a control at a traffic signal at the time of the column traveling in accordance with one or more embodiments.

With reference to FIG. 5, the preference control of the column at the traffic signal of an intersection or the like is described.

(Basic Preference Process)

In FIG. 5, the group of vehicles forming the column 20A that should receive preference is moving in the direction of a first intersection 501a. When the column approaches a point a predetermined distance (e.g., 300 m) away from the first intersection 501a, the signal managing apparatus 8 lights a green light of the traffic signal in the intersection. With this, the column 20A can enter the intersection without stopping and pass therethrough.

Further, the traffic signal at the next second intersection 501b may also be controlled. In this case, as shown in the drawing, the green lights at the first intersection 501a and the second intersection 501b may be lit at the same time. Alternatively, it is also possible to perform the proper control by lighting the green light at the timing of entry of the lead vehicle into each intersection. In the case where this control method is used, the green light at the second intersection 501b may be lit at the point of time when the lead vehicle enters a herald section 502 and the green light may be kept lit until the column passes through the second intersection 501b.

(Additional Preference Process)

Further, on an as needed basis, it is considered that the number of vehicles traveling ahead of the column is reduced by sending the order information to vehicles other than those in the column or executing a traffic control to make the road easy for the column to travel. For example, the traffic signal is controlled such that other vehicles do not enter the herald section 502 and the first or second intersection.

Such a process is performed, for example, in the case where the number of vehicles of the column 20A is large, on account of which the traffic jam suppression effect can be elicited greatly by the preferential passage and the case where the vehicles cannot pass completely with one intersection. In addition, such an additional preferential treatment may be performed for the vehicle having high social importance or as a bonus for a person who provides the sensing data having a high value.

(Competition Between Columns)

In the case where a plurality of columns serving as the targets of the preferential passage are present at the same time, a problem arises in how competition between the columns is handled. For example, when a column 20B is about to enter the second intersection 501b from another direction, a criterion for determining which column is prioritized is necessary. The criterion is determined according to the comprehensive situation of the traffic control system and the degree of influence on other vehicles. For example, it is possible to prioritize the column having the larger number of vehicles, or prioritize the column having the larger number of passengers and, in the case of the latter, car sharing is thereby promoted. Alternatively, by prioritizing an eco-car such as a hybrid car, a fuel-efficient car, or an EV car, switching to the eco-car can be promoted. Further, the column process application 71 may adjust the speeds of the columns using the order information and displace their timings of passage of the intersection from each other. Such adjustment can be implemented by information exchange between the column traveling control objects.

[Modification]

A modification related to the process of creating the travel plan is described. In the embodiment described above, the vehicular application 31 installed in the smartphone 3 creates the travel plan information based on the current position and the destination of the vehicle (S1014 in FIG. 2B) and transmits the travel plan information to the server side (S1031 in FIG. 2C). However, it is also possible to cause the server side to perform the travel plan creation process instead of causing the vehicle side to perform the travel plan creation process.

Specifically, the application server 7 receives the information of the current position and the destination from the communication device of the smartphone 3 (can also be referred to as a vehicle information transmission unit). Subsequently, the column process application 71 creates the travel plan by using arithmetic resources, and accumulates the travel plan in the DB 301. Then, similarly to the embodiment described above, the order information is transmitted to each vehicle from the column traveling control object.

This method also presents no hindrance to traveling of the vehicles in column. In addition, since it is not necessary for the smartphone 3 to perform heavy arithmetic processing for creating the travel plan, the smartphone 3 has the advantage of being able to be configured easily and inexpensively.

In one or more embodiments, the formation support for the column is performed as the vehicular positional relationship formation support. In one or more embodiments, a description is given of the case where navigation that forms the positional relationship other than the above positional relationship is performed as the order information.

(Positional Relationship in which Predetermined Distance is Kept from Another Vehicle)

First, there is a control in which a target vehicle is spaced a predetermined distance or more from another specific vehicle. For example, a vehicle traveling behind a bus as a public transportation is forced to stop or change lanes due to the stop of the bus at a bus stop. This delays the arrival at the destination, the driver is thereby stressed, and traffic interruption is thereby caused. To cope with this, in the order information from the server side, navigation indicating "do not enter into an area within 200 m behind the bus on the same lane" is performed. With this, it becomes possible to prevent the occurrence of the above problem. In this case, the travel plan information related to the vehicle other than the vehicle to be navigated such as the bus or the like need not necessarily be acquired by communication with the bus or the like. For example, by referring to a database related to the operation of the public vehicle, it is also possible to generate the order information to the vehicle to be navigated.

(Positional Relationship within Predetermined Range from Another Vehicle)

Next, there is a control in which the target vehicle and the host vehicle are kept within a range of a predetermined distance. For example, in the case where the group of a plurality of vehicles driven by colleagues of a company and the vehicles travel toward the same destination, the drivers want to arrive at the destination together (in close time periods) without having a distance between the vehicles. In this case, the individual vehicles are identified using the ID information of the smartphone or the like, and navigation is performed such that the vehicle are not spaced apart a predetermined distance (e.g., 100 m) or more by using the positional information. With this, the effect of being able to cause the vehicles to arrive at the destination in close time periods can be obtained.

By applying one or more embodiments the present invention, the following advantages are obtained.

(Advantage for Entire Traffic)

As described above, the main cause of the traffic jam is the traffic interruption at the traffic signal. In addition, differences in the destination of the vehicle, the driving technique of the driver, and the law-abiding spirit of the driver disturb the traffic to cause the traffic jam. As a result, accidents, deterioration of the environment, and a reduction in social productivity due to an increase in stress are caused.

However, according to the traffic control system according to the present invention, the group of vehicles is cause to form the column, the column is guided and given the preferential treatment at the traffic signal, and the navigation optimized as needed based on the road network data is performed. Thus, in contrast to the patterned conventional art, as the result of flexibly controlling the traffic signal according to the traffic situation, relatively many vehicles can smoothly travel. When this is viewed as the entire traffic system, the total number of stops of the vehicle at a red light is reduced and vehicles are not interrupted so that the traffic jam is alleviated.

In addition, it is possible to cause the driver to keep the legal speed with the order information and urge the driver to abide by traffic regulations by not giving the preferential treatment to the vehicle of which the speed exceeds the legal speed, and hence residents and road managers can enjoy the effect of improving safety. Further, it is possible to suppress the deterioration of the environment caused by the emission of the vehicle.

(Advantage for Driver and the Like)

Since the probability of stop at the traffic signal is reduced, the driver and the passenger of the vehicle can reach the destination speedily without stress. In addition, the number of stops or starts is reduced and the vehicle travels at a stable speed so that fuel efficiency is improved. Further, the influence by wind pressure is reduced due to the column traveling so that fuel efficiency is further improved. At this point, by following the navigation from the server side, the driver can automatically drive the vehicle while keeping the legal speed, and the number of encounters with other vehicles is reduced so that the driver becomes less likely to cause a traffic accident.

In addition, since the instruction to form the group is transmitted from the server side in the present invention, the drivers can form the column without conferring with each other on the route and the traveling time period in advance. As another effect, it is possible to enhance the fellow feeing of the drivers. That is, there is a high possibility that persons having the same destination and traveling time period have similar zones of life and similar behavior patterns (e.g., working areas, school areas, leisure), and hence it is possible to establish new human relations.

Further, it is possible to obtain the preferential treatment other than the preferential passage at the traffic signal, e.g., as described in FIG. 4, the advantage in the traffic system or the economic advantage by the associated business operator. In this case, the associated business operator also has the advantage of increasing a business opportunity with the visit of customer groups.

(Advantage of Sensor Network)

In the present invention, the advantages of the sensor network can be enjoyed intact. That is, the advantages are the effective use of the sensor and easy data acquisition. Further, by performing the column traveling process in combination with the car navigation application as the function used by many vehicles, the amount of traded sensing data is increased and economic activities are activated.

It becomes possible for the operator of the sensor network and the data user to collect and use the sensing data having high reliability. In particular, by an averaging process and a majority logic process based on the data of a plurality of vehicles participating in the group, reliability is improved. In addition, a sensor fusion process may also be performed by obtaining image information in addition to the position information and the speed information. With this, for example, it becomes possible to use a sensor for detecting damage to the road surface and detect an illegally-parked vehicle, which is useful for applications that provides such services. Further, it is effective for an application for predicting the traffic jam to obtain the travel plan information of each vehicle.

On the other hand, the owner of the sensor device (the vehicle or the smartphone) as the data provider of the sensor network can increase a data sale opportunity.

Note that the vehicle in the present invention is not limited to a four-wheeled vehicle. For example, the group of only two-wheeled vehicles or the group of the four-wheeled vehicle and the two-wheeled vehicle may also be accepted. In addition, the vehicle can also include a bicycle depending on its speed.

In one or more embodiments, a method for performing a proper data flow control in order to efficiently use information on things that are connected to the network and constitute the IoT is described. Herein, various sensors are assumed as the "things", and information having a new value is generated from obtained sensing data. The frame of the present embodiment can be applied not only to data circulation having a usage charge and the like as conditions but also to more extensive data use. In addition, in the present embodiment, the sensor network server performs the data flow control, and the application of the present invention is not limited thereto. For example, it is also possible for the individual sensor network adaptors to cooperate with each other to use mutual information items while functioning autonomously.

<Sensor Side Event-Driven Type Access Mode>

FIG. 6A is a view for explaining an example of the elements of the system and the flow of data in the present embodiment. Main elements include sensors (631A and 631B), a sensor network adaptor 63, the sensor network server 6, the application server 7, and the network 4 such as the Internet.

(Apparatus Configuration)

Each of the sensors (631A and 631B) is a device that detects some physical quantities and their changes, and records or outputs them as the sensing data. The sensor network adaptor 63 is physically or electrically connected to the sensor to acquire the sensing data. In addition, the sensor network adaptor 63 performs a predetermined process on the sensing data using the information processing apparatus such as the CPU or the like. Further, the sensor network adaptor 63 has the function of communicating with the outside and is capable of communicating with the application server 7 and the sensor network server 6 via the network 4.

As an example, the smartphone can be assumed as the sensor network adaptor 63, and the position sensor (GPS) and the acceleration sensor can be assumed as the sensors 631A and 631B. In the case of the smartphone, a camera, a microphone, or an input system can be the sensor.

The sensor network server 6 performs matching between information related to the sensor and information related to the application, and performs the data flow control as the instruction to the sensor side. The sensor network server 6 acquires information from a sensor side metadata DB 661 and an application side metadata DB 662. Each DB may be provided inside or outside the server. Herein, the metadata denotes information (sensor side metadata) related to the attribute of each of the sensor and the sensing data obtained by the sensor and information (application side metadata) related to the attribute of each of the application and the sensing data required by the application that are used for the retrieval and the matching by the server. A matching process and the structure of the metadata are described later.

The application server 7 performs arithmetic processing by using the sensing data, and generates different information items for different purposes. For example, it can be assumed that a traffic information application that performs traffic jam situation distribution and route guidance by using the position information and the acceleration information of each vehicle is caused to operate in an application server 7*k*, and it can be assumed that a traffic volume research application is caused to operate in an application server 7*m*.

(Process Flow)

The procedures of the process are described with reference to the flowchart in FIG. 7.

In Step S701, the sensor 631 acquires the sensing data.

In Step S702, the sensor network adaptor 63 detects an event occurrence (circled number 1 in FIG. 6A). Subsequently, the sensor network adaptor 63 transmits a sensor side event notice to the sensor network server (circled number 2).

A detection process is executed by a method corresponding to the types of the sensor and the adaptor. For example, in the sensor that continuously acquires a statistic, the adaptor periodically monitors the statistic and, when the statistic becomes not less than a threshold value, the adaptor determines the event occurrence. Examples thereof include the case where the statistic becomes not less than the threshold value in speed detection by the speed sensor used for the vehicle or in water level detection by a level sensor, and the case where a change of a pixel value of a predetermined value or more is detected in an image sensor.

In addition, depending on the information processing capability of the sensor network adaptor 63, the state change may be determined by interpreting the change of the statistic. For example, it is considered that the state is determined as a "dangerous driving state" in the case where the detection value of the speed sensor exceeds the legal speed, and it is determined that "water leakage occurs" in the case where the level sensor detects a value not less than a predetermined value. In addition, image processing such as person recognition or the like may be carried out based on the change of the pixel value obtained using the image sensor, and information indicative of presence of a person or the identified name of the person may be used as the detection result. Besides, in the case where the sensor is a switch, ON or OFF of the switch is detected.

In Step S703, the sensor network adaptor searches for the metadata of the application that matches the metadata of the sensor 631A recorded in the sensor side metadata DB 661.

In S703, when the matching application is present, in Step S704, the sensor network server creates a data flow control order, and transmits the data flow control order to the sensor network adaptor (circled number 3).

In Step S705, the sensor network adaptor 63 having received the order transmits the sensing data (circled number 4) to the application servers 7k and 7m via the network 4.

An example of data configuration when the sensing data is transmitted is described (circled number 5). At the time of the transmission, the designation of the destination is required. As an example of the method for designating the destination, it is possible to use the combination of an IP address of the application server, an application file name (name of a program using the sensing data), and a tag name assigned to the sensing data in the application file. The tag may be appropriately caused to correspond to the variable used in the process in the program. In the case where the sensor outputs a plurality of data items, the case can be handled by increasing the number of tags mentioned above. Such data is transmitted from the sensor network adaptor 63 to the application server 7 using TCP/IP protocol.

In Step S706, the application server uses the sensing data to provide a service having an added value.

(Data Structure and Matching Process)

As shown in FIG. 6B, the sensor side event notice (circled number 2) includes at least information that identifies the sensor. There is a method that identifies the sensor with the sensor address allocated to each sensor, or the sensor adaptor and its port number. Further, by transmitting a predetermined event code for identifying the detected event, a more sophisticated control can be executed.

In addition, the data flow control order (circled number 3) that characterizes the present embodiment includes information of a data transmission source and information of a data transmission destination. That is, the data flow control order denotes order information for circulating the sensing data from the proper provider to the proper user according to the result of the matching process. The former designation method may be the same as that of the sensor side event information. The latter designation method can use the IP address and the like, as described above.

In the sensor side metadata DB 661, all of the metadata is registered for each sensor address. An example of the data structure is shown in FIG. 12A. The DB includes information related to the sensor and information related to the sensing data. An example of the former includes "(4) ID AND ADDRESS OF SENDOR" below "1. ATTRIBUTE INFORMATION OF SENSOR", and the sensor can be identified with this. In addition, the latter includes the event occurrence code shown in FIG. 6B. By using the event occurrence code, it is possible to perform a sophisticated control in which the application is selected according to the event type. In addition, it is possible to implement periodic communication and the notice of the event occurrence with the same protocol.

The application side metadata is registered in the application side metadata DB 662 for each application. An example of the data structure is shown in FIG. 12B. The DB includes information related to the sensing data required by the application and information of the application itself.

The sensor address is acquired by analyzing the sensor side event notice received by the sensor network server 6, and the sensor side metadata DB 661 is searched for with the sensor address used as the key. With this, information shown in FIG. 12A is obtained. Next, the sensor network server 6 searches the application side metadata DB 662 for the application that requires the sensing data obtained by the sensor. Specifically, the information of the sensor and the sensing data is matched against "1. ATTRIBUTE INFORMATION OF REQUIRED SENSOR" to "5. MANAGEMENT ATTRIBUTE OF REQUIRED SENSING DATA" of FIG. 12B and, in the case where there is a match, the data is adopted. An allowance may be provided such that the data is transmitted when the condition is in a predetermined range even in the case where the condition does not completely match the necessary condition of the application side. Note that the condition in the matching includes not only the condition related to the types of the sensor and the sensing data but also the condition of the compensation for use. Conversely, the compensation for use can be one type of the metadata.

There is the case where one application is identified by the matching or the case where a plurality of the applications are identified thereby and, in the case where the plurality of the applications are identified, the applications can operate on the same server or different servers. In addition, there are cases where the applications communicate with each other and operate in cooperation with each other. The sensor network server 6 refers to "6. METADATA OF APPLICATION ITSELF" of FIG. 12B to create the data flow control order and issue the instruction to the sensor network adaptor 63.

According to the system described above, in contrast to the conventional IoT in which the sensor and the user are fixed, it becomes possible to optimize the information circulation including the process of the compensation for use with regard to the transmission/reception of the sensing data on the network. Consequently, information having a new added value is generated in the application server, and sensor resources are effectively used. For example, in the case where the sensor information of the moving vehicle is required, it is possible to seamlessly provide the information in the system where the elements are fluid. In addition, on the application side, in the case where there are a plurality of the sensor candidates, it is possible to select a profitable sensor based on the condition of the compensation for use and enhance accuracy by using all of the plurality of the sensors. Further, the sensing data process can be executed at various granularities according to the characteristics of the sensor and the application, and hence it is possible to form the data base having high versatility.

<Application Side Event-Driven Type Access Mode>

FIG. 8A is a view for explaining another example different from the above-described sensor side event-driven type access mode that is related to the elements of the system and the flow of data in the present embodiment. The elements themselves are the same as those in the above example, but the trigger of the process start and procedures are different.

(Process Flow)

With regard to a process flow, a part different from the flow in FIG. 7 is mainly described. Herein, as an example of an application side event-driven type access mode, the case where the traffic control system application performs the traffic volume control is described.

When receiving the notice of occurrence of the accident in the intersection, the application operates to reduce the traffic volume of the road flowing into the intersection by using the notice thereof as the trigger (circled number 1). In order to obtain the sensor information of the monitoring camera and the vehicle in the area, the application transmits an application side event notice (circled number 2) to the sensor network server. As shown in FIG. 8B, it is preferable to perform a detailed control by adding information such as the event code or the like to this notice.

The sensor network server 6 transmits the data flow control order shown in FIG. 8B to the sensor network adaptor 63 (circled number 3). Similarly to FIG. 6B, the details of the order include information of the destination of the data. The sensor network adaptor 63 having received the order transmits the sensing date from the sensor 631A (circled number 4) using a packet system to which a predetermined header is added via the network 4 (circled number 5). For example, the position information is collected when the sensor is a vehicle-mounted GPS, the image data or information obtained by analyzing the image data on the adaptor side are collected when the sensor is the image taken by the monitoring camera on the road shoulder. The traffic control system application (file name m) in the application server 7m grasps the traffic conditions by using the collected information and executes the signal control and information provision to an electric bulletin board on the roadside.

<Sensor Side Metadata-Driven Type Access Mode>

Figure 9A:
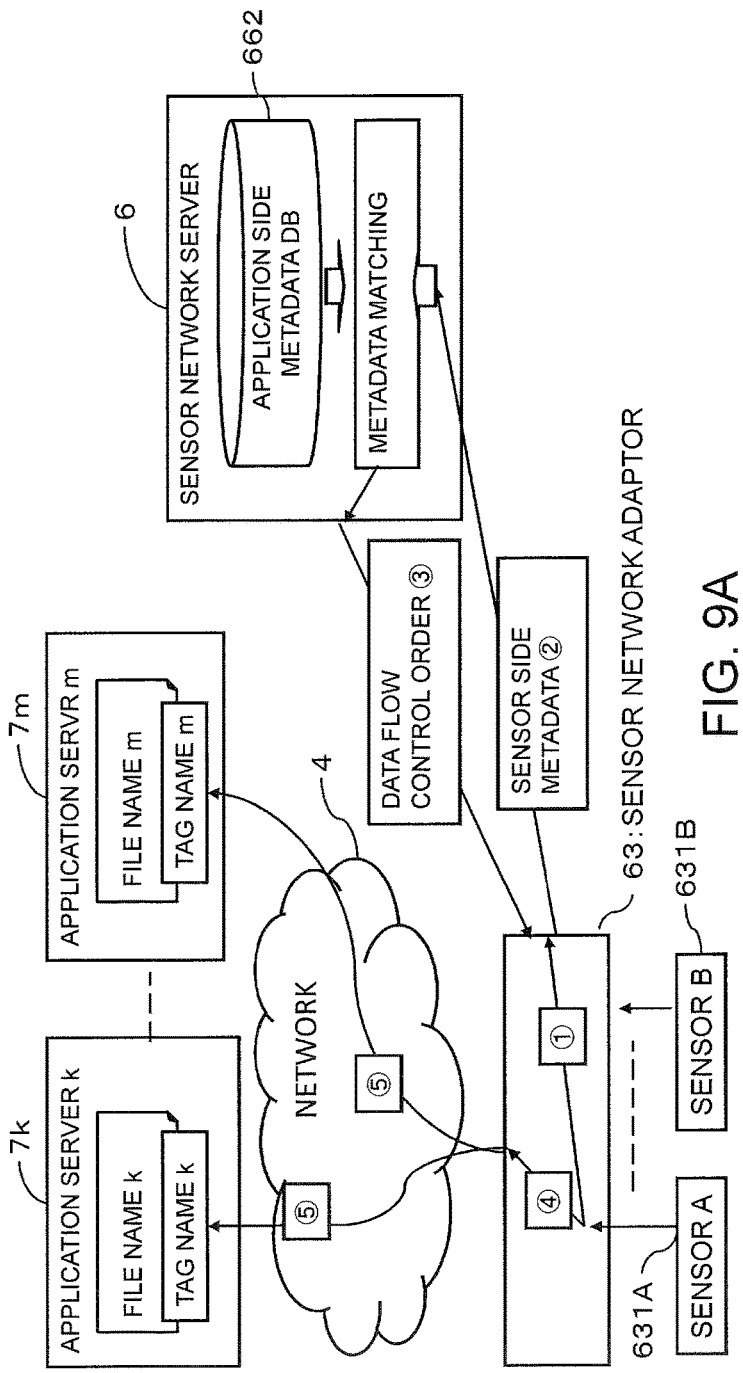
FIG. 9A is a view for explaining a data flow control in a sensor side metadata-driven type access mode in accordance with one or more embodiments and FIG. 9B is a view showing a data structure used in the control in accordance with one or more embodiments.

FIG. 9A is a view for explaining another example different from the above examples that is related to the elements of the system and the flow of data in the present embodiment. Among the elements of the system, the sensor side metadata DB 661 of the sensor network server 6 is not present.

(Process Flow)

With regard to the process flow, a part different from each example is mainly described. Herein, as an example of a sensor side metadata-driven type access mode, the case where an image distribution application on the application server distributes a drive experience image based on a moving image taken from the vehicle traveling on an actual road is described.

Figure 9B:
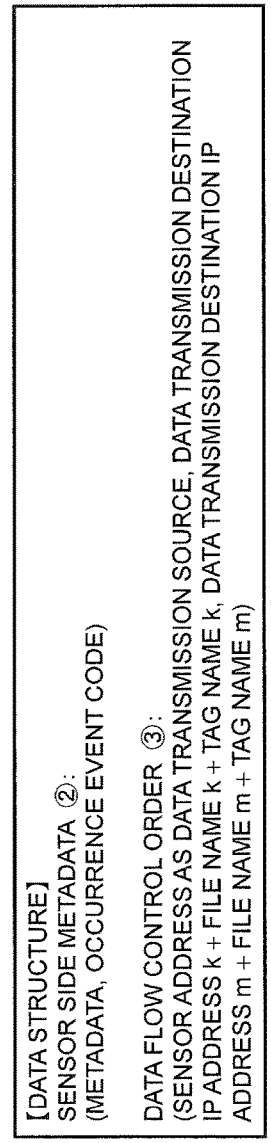

The sensor 631A as the vehicle-mounted camera acquires the moving image as the sensing data. The sensor network adaptor 63 detects this as the event occurrence (circled number 1), and transmits the sensor side metadata (circled number 2). As shown in FIG. 9B, this includes the metadata shown in FIG. 12A, and the sensor is identified with the sensor address in the metadata. It is also preferable to perform the detailed control by adding information such as the event code or the like to this notice. The sensor network server 6 performs the matching by comparing the received sensor side metadata with the application side metadata DB 662 to create the data flow control order (circled number 3). Note that the received metadata may be registered in a storage device (not shown). With this, the sensor side event-driven type access mode and the present access mode can be used seamlessly.

The sensor network adaptor 63 having received the data flow control order transmits the moving image as the sensing data (circled number 4) using the packet system to which the predetermined header is added via the network 4 (circled number 5). The image distribution application (file name m) in the application server 7k provides a service by using the obtained data.

In the present access mode, since the metadata is always transmitted from the sensor side, even with the sensor of which the position is changed such as, e.g., the vehicle-mounted camera, the matching using the information having high freshness in which the latest state is reflected is performed. In addition, the metadata is accumulated in the sensor network server, and it is thereby possible to implement both of the event-driven type and the metadata-driven type.

<Application Side Metadata-Driven Type Access Mode>

Figures 10A, 10B:
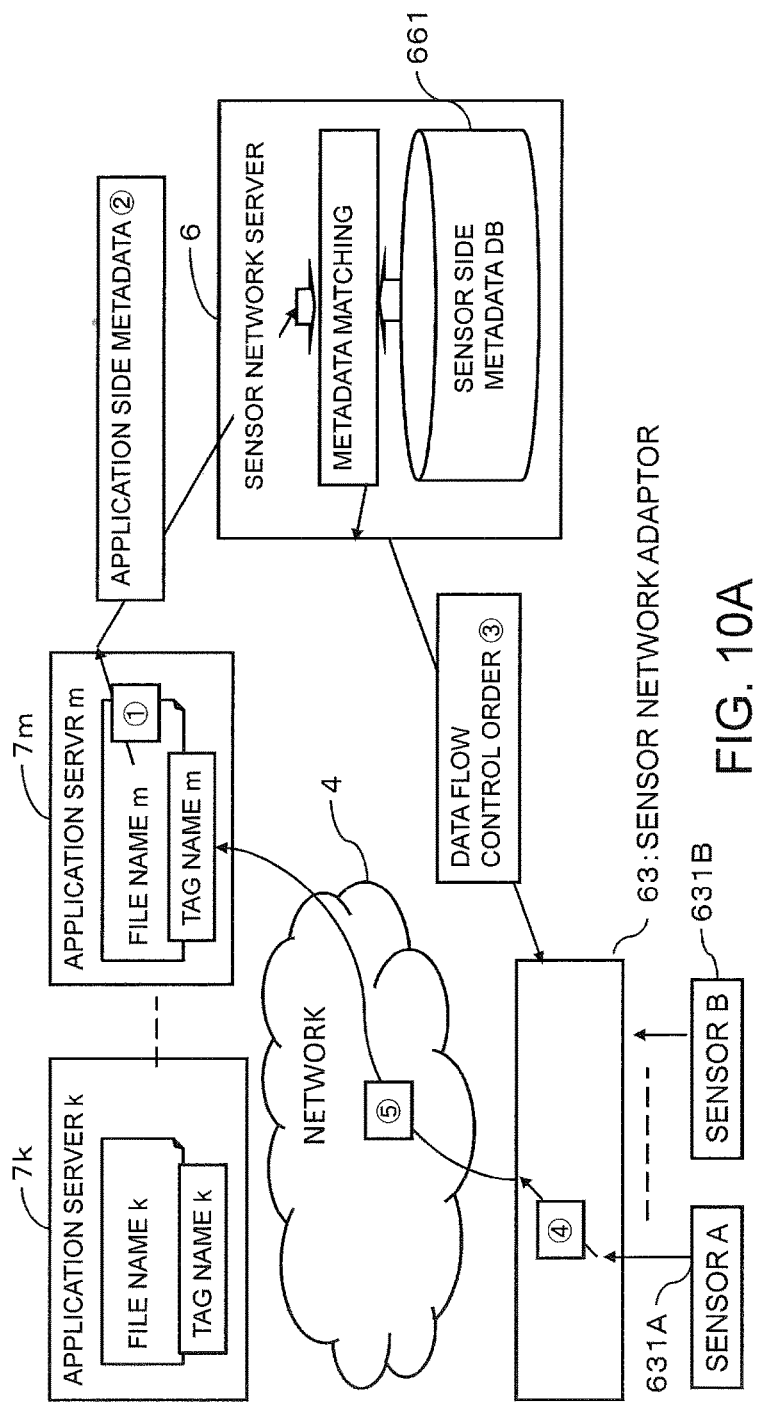
FIG. 10A is a view for explaining a data flow control in an application side metadata-driven type access mode in accordance with one or more embodiments and FIG. 10B is a view showing a data structure used in the control in accordance with one or more embodiments.

FIG. 10A is a view for explaining another example different from the above examples that is related to the elements of the system and the flow of data in the present embodiment. Among the elements of the system, the application side metadata DB 662 of the sensor network server 6 is not present.

(Process Flow)

With regard to the process flow, a part different from each example is mainly described. Herein, as an example of an application side metadata-driven type access mode, the case where a car navigation application installed in the smartphone provides the image and the information of the position a little distance ahead or a few minutes later (e.g., 1 km ahead or 10 minutes later) according to the movement of a holder of the smartphone. This can be used when the situation in the direction of movement of the vehicle is grasped and it is determined whether or not its course is changed.

The car navigation application operates to provide the situation a little distance ahead or a few minutes later by using the occurrence of the event such as a guidance request or the like by the driver caught in a traffic jam as the trigger (circled number 1). In order to obtain the sensor information of the monitoring camera and the vehicle in the area, the application side metadata is transmitted to the sensor network server 6 (circled number 2). As shown in FIG. 10B, this includes the metadata shown in FIG. 12B. It is also preferable to perform the detailed control by adding information such as the event code or the like to this notice.

The sensor network server 6 performs the matching between the received metadata and the sensor side metadata DB 661 to identify the sensor capable of providing the sensing data required by the application. Subsequently, the data flow order is created and transmitted to the sensor network adaptor 63 (circled number 3). Note that the received metadata may be registered in the storage device (not shown).

The sensor network adaptor 63 having received the data flow control order transmits the sensing data (circled number 4) using the packet system to which the predetermined header is added via the network 4 (circled number 5). As the sensing data, there can be considered the sensing data items of various types and granularities such as, e.g., the position information of the vehicle, the image information of the road, and the congestion state of the road obtained by analyzing these information items using the information processing apparatus. The car navigation application (file name m) in the application server 7*m* provides information to the driver by using the obtained data.

In the present access mode, since the metadata is transmitted from the application side, even in the case where the situation of the application side is constantly changed such as, e.g., the case of the vehicle-mounted smartphone, the matching that uses the information having high freshness in which the latest state is reflected is performed. In addition, the metadata is accumulated in the sensor network server, and it is thereby possible to implement both of the event-driven type and the metadata-driven type.

<Control Mode Using Sensing Data DB>

Figures 11A, 11B:
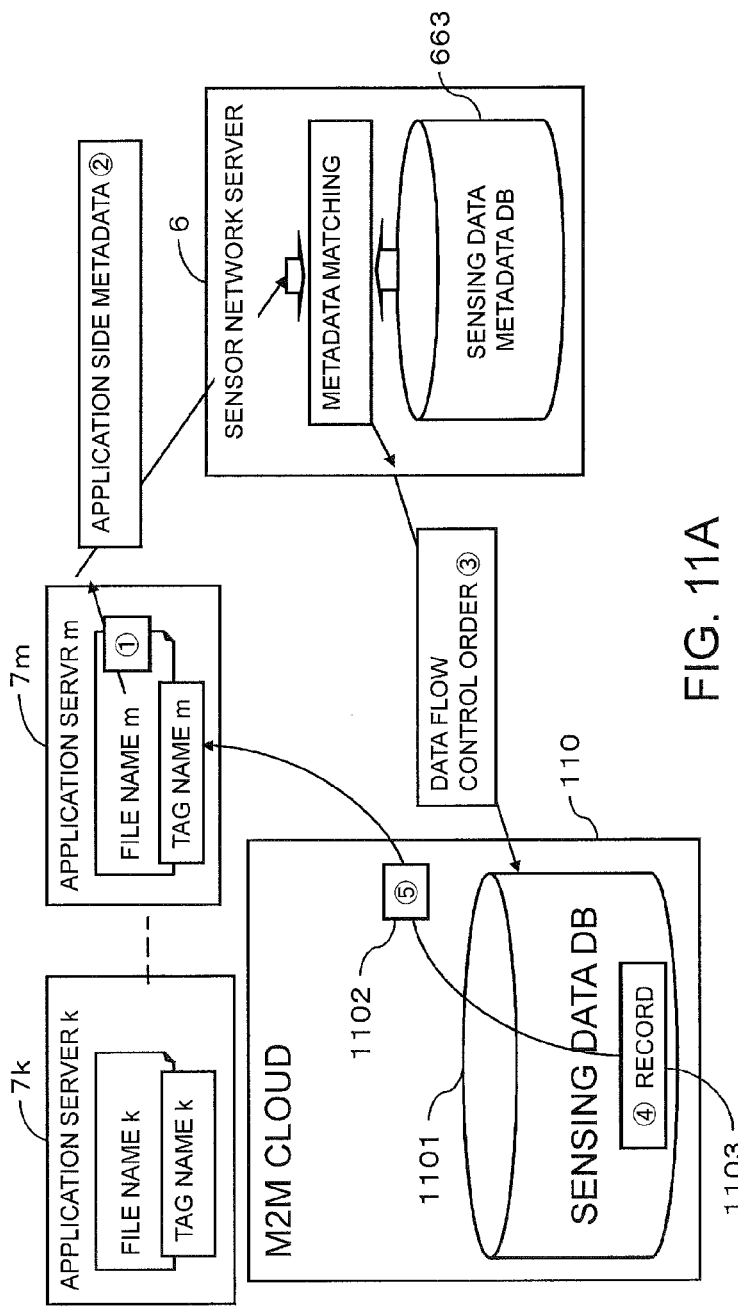
FIG. 11A is a view for explaining a data flow control using a virtual sensor and a DB that stores sensing data in accordance with one or more embodiments and FIG. 11B is a view showing a data structure used in the control in accordance with one or more embodiments.

FIG. 11A is a view for explaining another example different from the above examples that is related to the elements of the system and the flow of data in the present embodiment. As the element of the system, a sensing data DB 1101 is disposed on the platform of the M2M cloud 110, and a record 1103 is stored in the sensing data DB 1101. In addition, in the sensor network server 6, a metadata DB 663 of the sensing data is present. In addition, as described later, the format of the data flow control order as the feature of the present invention is also different.

(Process Flow)

With regard to the process flow, a part different from the "application side metadata-driven type access mode" is mainly described. Herein, an example in which the situation of the present flow occurs includes the case where a manager who is to research the cause of a traffic accident that has happened confirms the situation on the road at a point of time in the past.

The manager requests the application to provide the situation at a given point of time. By using this as the trigger (circled number 1), in order to obtain the sensor information of the monitoring camera and the vehicle in the area, the application side metadata is transmitted to the sensor network server 6 (circled number 2). As shown in FIG. 11B, this includes the metadata shown in FIG. 12B. It is also preferable to perform the detailed control by adding the information such as the event code or the like to this notice.

The sensor network server 6 performs the matching between the received metadata and the metadata DB 663 of the sensing data to determine whether or not the past sensing data required by the application can be provided from the DB on the M2M cloud. Subsequently, the data flow control order is created and transmitted to the M2M cloud 110 (circled number 3). Note that the received metadata may be registered in the storage device (not shown). As shown in FIG. 11B, the data flow control order includes information that identifies the record in the DB of the M2M cloud.

The M2M cloud 110 having received the data flow control order transmits the image and the vehicle information (circled number 4) as the sensing data at a given point of time in the past using the packet system to which the predetermined header is added via the network 4 (circled number 5). The application (file name m) provides information to the manager by using the obtained data.

In the present control mode, since the metadata is transmitted from the application side, even in the case where the situation of the application side is constantly changed such as, e.g., the case of the vehicle-mounted smartphone, the matching that uses the information having high freshness in which the latest state is reflected is performed. In addition, it is also possible to dispose the high-performance information processing apparatus on the M2M cloud to perform sensor fusion. For example, in the flow described above, the information provision based on the sensing data is performed on the application server side, and the information is used as a material for judging of the manager. However, the information processing apparatus on the M2M cloud may act as a virtual sensor that unifies the information obtained from a plurality of sensors to determine the situation and replies to the application side. In this case, the data flow control order is transmitted to the information processing apparatus constituting the virtual sensor.

Further, by using huge data present on the M2M cloud, it is possible to configure a large-scale virtual sensor. In particular, the smartphone that is rapidly spreading in recent years is expected as the provider of the sensing data because of the large number of units and its high functions, and the smartphone is suitable for the application of the present invention that promotes the data circulation on the platform of the cloud.

<Switching of Access Mode>

Although the individual access modes and the configuration in the control mode are described above by using the drawings, the same configuration can be used in each mode in the actual system. The mode can be switched seamlessly or can be used in a fixed manner. In the case of the former, for example, the access mode is switched according to whether or not the data received from the application side includes the metadata or is the event notice. Alternatively, the received data is caused to include mode designation. In the case where there is no sensor that meets the request from the application side in the metadata matching, it is also possible to retrieve the metadata on the M2M cloud. Further, in the sensor side or application side metadata-driven type access mode, by storing the received metadata on an as needed basis, it is possible to increase the area that can be searched.

<Example of Registration/Update Process of Metadata DB>

In each mode described above, in the case where the change of the metadata of the sensor or the application occurs, a registration/update process of the metadata DB in the sensor network server is required. It is necessary to execute the registration/update process such that a reduction in the efficiency of the function of circulation of the sensing data based on the metadata matching is minimized. There is a method in which, when the sensor or the application transmits the data (the event notice or the metadata) to the sensor network server, an access mode flag for differentiating between the access modes is transmitted together. Hereinbelow, the procedures thereof are described.

(In Case where Sensor Side Metadata is Newly Registered/Updated)

In this case, the "sensor side metadata-driven type access mode" is designated by the flag. The sensor network server having received the data registers the metadata in the sensor side metadata DB, and transmits a message indicating that the execution of the "sensor side event-driven type access mode" is allowed thereafter to the sensor network adaptor.
(In Case where Application Side Metadata is Newly Registered/Updated)

In this case, the "application side metadata-driven type access mode" is designated by the flag. The sensor network server having received the data registers the metadata in the application side metadata DB, and transmits a message indicating that the execution of the "application side event-driven type access mode" is allowed thereafter to the application server.
(In Case where Metadata of Sensor is Already Registered and Update is not Necessary)

In this case, the "sensor side event-driven type access mode" is designated by the flag. In the case where the situation in which the application cannot be detected in the matching of the metadata continues for a reference time or longer, the sensor network server having received the data transmits information indicating that the update of the metadata is necessary to the sensor network adaptor.
(In Case where Metadata of Application is Already Registered and Update is not Necessary)

In this case, the "application side event-driven type access mode" is designated by the flag. In the case where the situation in which the sensor cannot be detected in the matching of the metadata continues for a reference time or longer, the sensor network server having received the data transmits information indicating that the update of the metadata is necessary to the application server.
<Configuration of Metadata>

The content of the metadata of each of the sensor side and the application side and the summary of its use method are described. Note that the meta data items mentioned herein are representative examples so that it is not necessary to include all of them and information not shown in a table may also be added.
(Metadata of Sensor and Sensing Data)

In FIG. 12A, "1. ATTRIBUTE INFORMATION OF SENSOR" is information of the sensor itself and, in particular, "(4) ID AND ADDRESS OF SENSOR" serves as the key for identifying the sensor in the matching. "2. ATTRIBUTE INFORMATION OF SENSING TARGET" and "3. ATTRIBUTE INFORMATION PF SENSING TARGET AREA" serve as materials for determining whether or not data required by the application in terms of the type is obtained. "4. ATTRIBUTE INFORMATION OF SENSING OPERATION" serves as a material for determining whether or not data accuracy required by the application is obtained. "5. MANAGEMENT ATTRIBUTE OF SENSING DATA" is used when the compensation for use required in the data circulation and the width of reliability of data are set.
(Metadata of Application and Sensing Data Required by Application)

In FIG. 12B, "1. ATTRIBUTE INFORMATION OF REQUIRED SENSOR", "2. ATTRIBUTE INFORMATION OF REQUIRED SENSING TARGET", "3. ATTRIBUTE INFORMATION OF REQUIRED SENSING TARGET AREA", AND "4. ATTRIBUTE INFORMATION OF REQUIRED SENSING OPERATION" are necessary in order to identify the request of the application in the matching. "5. MANAGEMENT ATTRIBUTE OF REQUIRED SENSING DATA" is also used in matching determination together with the compensation for use and reliability. "6. METADATA OF APPLICATION ITSELF" is required when the data flow control order is generated. For example, in the case where the event code in the event notice matches "(3) SENSOR SIDE EVENT ALLOWING ACTIVATION OF APPLICATION" in the application side metadata and other metadata items match each other, the application can be activated by an interrupt from the sensor side.

As described above, one or more embodiments of the present invention characterized in the system in which the sensing data circulation is managed by the data flow control order can be viewed from various angles. Typically, one or more embodiments of the present invention are viewed as the sensor network server (data flow control order generating apparatus) that performs the matching process in response to the reception of the event notice or the metadata to generate the data flow control order. In this case, a sensor side metadata acquisition unit or an application side metadata acquisition unit of one or more embodiments of the present invention acquires the metadata from the metadata DB or the received data. In addition, the information processing apparatus in the server functions as a matching unit and an instruction unit. This is applicable to the configuration that uses the sensor network adaptor (sensor managing apparatus) and the configuration in which the sensing data is stored in the database on the M2M cloud.

In addition, one or more embodiments of the present invention can also be viewed as the sensor network adaptor (sensor managing apparatus) that controls the data circulation in response to the data flow control order. In this case, the information processing apparatus and the communication device in the adaptor function as an order reception unit, a transmission unit, and a detection unit of the present invention.

Further, one or more embodiments of the present invention can also be viewed as a program that causes the information processing apparatus to execute the processes in the individual elements in the system. Furthermore, one or more embodiments of the present invention can also be viewed as a control order data stream that has the structure of data that is arranged according to a predetermined rule based on the result of the matching, and works on the information processing apparatus of the sensor network adaptor to implement the proper circulation of the data.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: traffic control system

2: vehicle, 20: vehicular column

3: smartphone, 31: vehicular application

4: mobile network

5: M2M cloud server

6: sensor network server

7: application server, 71: column process application

8: signal managing apparatus

9: traffic signal

63: sensor network adaptor, 631A•631B: sensor

661: sensor side metadata DB, 662: application side metadata DB

The invention claimed is:

1. A column travel generating apparatus for generating a column of vehicles, comprising:
   a receiving unit for receiving, from Machine to Machine cloud server, information stored in a memory of the Machine to Machine cloud server, the information including a respective current position and a respective travel plan of each vehicle of a plurality of vehicles;
   a column traveling generation processing unit for extracting, from the information received from the Machine to Machine cloud server, column traveling data including a column traveling group candidate, a column traveling section, and a column traveling time period;
   an object generating unit for generating a column traveling control object for each of the column traveling data; and
   an order transmitting unit for transmitting an order to the vehicle for urging participation in the column, wherein
   the column traveling control object transmits an order to request the signal operation to a signal managing apparatus.

2. The column traveling generating apparatus according to claim 1, wherein the column traveling data includes information for identifying extracted vehicles, information for identifying the column traveling section, and the column traveling period.

3. The column traveling generating apparatus according to claim 1, wherein the column traveling generation processing unit refer to the data memory apparatus, and, in the case where the number of the vehicles that follow the same route in the same time period is a predetermined number or more, the vehicles are extracted as the vehicles in the column.

4. The column traveling generating apparatus according to claim 3, wherein the column traveling generation processing unit performs extractions, the column traveling section is determined, and then the vehicles which travel in the same column traveling section in the same time period are picked up.

5. The column traveling generating apparatus according to claim 1, wherein the column traveling control object transmits an order to request the signal operation to a signal managing apparatus.

6. The column traveling generating apparatus according to claim 5, wherein the order to request the signal operation includes position information of a target traffic signal which is managed by the signal managing apparatus and time when green light is lit.

* * * * *